US006765216B2

(12) United States Patent
Kagadei et al.

(10) Patent No.: US 6,765,216 B2
(45) Date of Patent: Jul. 20, 2004

(54) METHOD AND APPARATUS FOR PRODUCING ATOMIC FLOWS OF MOLECULAR GASES

(75) Inventors: Valery A. Kagadei, Tomsk (RU); Dmitry I. Proskurovsky, Tomsk (RU)

(73) Assignee: Atomic Hydrogen Technologies Ltd., Katzrin (IL)

( * ) Notice: Subject to any disclaimer, the term of this patent is extended or adjusted under 35 U.S.C. 154(b) by 193 days.

(21) Appl. No.: 10/086,621

(22) Filed: Mar. 4, 2002

(65) Prior Publication Data

US 2003/0165617 A1 Sep. 4, 2003

(51) Int. Cl.[7] ......................... G01N 21/01; G01N 21/51

(52) U.S. Cl. ............................. 250/423 R; 204/192.12; 315/111.81; 315/111.01

(58) Field of Search ................. 250/423 R; 315/111.81, 315/111.01; 204/192.12

(56) References Cited

U.S. PATENT DOCUMENTS 4,030,996 A * 6/1977 Penfold et al. ........ 204/192.12
4,282,083 A * 8/1981 Kertesz et al. ......... 204/298.17
4,344,019 A * 8/1982 Gavin et al. ............ 315/111.81
4,423,355 A * 12/1983 Kageyama ............. 315/111.81
4,728,862 A * 3/1988 Kovarik et al. ......... 315/111.01
4,842,703 A * 6/1989 Class et al. ............ 204/192.12
5,336,533 A * 8/1994 Balmashnov et al. ....... 427/562
5,482,611 A * 1/1996 Helmer et al. ......... 204/298.17
5,597,459 A * 1/1997 Altshuler ............... 204/192.12
5,693,173 A 12/1997 Colombo et al.
5,702,573 A * 12/1997 Biberger et al. ....... 204/192.12
6,124,675 A * 9/2000 Bertrand et al. ........ 315/111.91
6,661,178 B1 * 12/2003 Bertrand et al. ........ 315/111.91

FOREIGN PATENT DOCUMENTS

RU 2088056 8/1997

OTHER PUBLICATIONS

Anishchenko et al., *Dry Cleaning of Fluorocarbon Residues by Atomic Hydrogen Flow*, International Conference Micro– and Nanoelectronic, ICMN–2003 (Oct., 2003), pp. 1–6.

Anishchenko et al., *Residual Photoresist Removal from Si and GaAs Surface by Atomic Hydrogen Flow Treatment*, International Conference Micro– and Nanoelectronic, ICMN–2003, (Oct., 2003), pp. 1–5.

Bozhkov et al., *A Comparative Study of the Atomic Hydrogen Penetration into the Thin Vanadium Films and Silicon Oxide–Gallium Arsenide Structures, Technical Physics Letters*, vol. 26, No. 10 (2000), pp. 926–928.

Chaldyshev et al, *Hydrogenation of GaAs Films Grown at Low Temperature*, Symposium on Non–Stoichiometric III–V Compounds, (Oct., 2001), pp. 1–6.

Kagadeĭ et al, *Atomic Hydrogen Flux Density Measured Using Thin Metal Films, Technical Physics Letters*, vol. 29, No. 11 (2003), pp. 897–900.

(List continued on next page.)

*Primary Examiner*—John R. Lee
*Assistant Examiner*—Kalimah Fernandez
(74) *Attorney, Agent, or Firm*—Browdy and Neimark, P.L.L.C.

(57) ABSTRACT

A method and device are presented for producing an intensive flow of atoms from an input flow of a molecular gas. Effects of ignition of a gas discharge of a complex type and dissociation of the gas molecules by electron impact in a discharge cell are utilized. The flow of atoms is output from the discharge cell through at least one emitting aperture. The complex gas discharge is composed of a main discharge and two auxiliary discharges of different types ignited in substantially coinciding zones of the discharge cell. The main discharge is an arc Penning discharge ignited in the vicinity of at least one emitting aperture. The first auxiliary discharge is a magnetron discharge with heated cathode, and the second auxiliary discharge is either a Penning discharge, or a Penning discharge with hollow cathode. The dissociation of the gas molecules is thereby carried out in the complex discharge and results in creation of the flow of hot and thermally atoms.

43 Claims, 11 Drawing Sheets

OTHER PUBLICATIONS

KagadeI et al, *Current–Voltage Characteristics of a Reflux Discharge with a Hollow Cathode and Self–Heating Electrode, Technical Physics*, vol. 46, No. 3 (2001), pp. 292–298 Pulished in Mar. 2001.

KagadeI et al, *The Effect of Atomic Hydrogen Flow on Electrical Resistance of the Transition Metal Films*, The European Material Conference, E–MRS, (Jun., 2003), pp. 1–15.

KagadeI et al, *The Effect of Hydrogenation on the Photoconductivity of Ion–Doped Gallium Arsenide Structures, Technical Physics Letters*, vol. 26, No. 4 (2000), pp. 269–271.

KagadeI et al, *The Effect of Hydrogenation on the Sink Breakdown Voltage of Transistors Based on Ion–Doped Gallium Arsenide Structures, Technical Physics Letters*, vol. 29, No. 1 (2003), pp. 12–15.

KagadeI et al, *Hydrogenation Kinetics and Change in Resistance of Thin Vanadium Films Under Treatment by Atomic Hydrogen Flow, Izvestive Vysshikh Uchebkh Zavedenii, Fizika*, No. 11 (2003), pp. 67–76 (Abstract only).

KagadeI et al, *In situ Cleaning of GaAs and $A1_xGa_{1-x}As$ Surfaces and Production of Ohmic Contacts using an Atomic Hydrogen Source Based on a Reflected Arc Discharge, Journal of Vacuum Technology*, vol. 17 (1999), pp. 1488–1493.

KagadeI et al, *Investigation of the Penetration of Atomic Hydrogen from the Gas Phase into $SiO_2$/GaAs, Journal of Vacuum Technology*, vol. 19 (2001), pp. 1871–1877.

KagadeI *Modeling Atomic Hydrogen Diffusion in GaAs*, International Conference Micreo– and Nanoelectric, ICMN, (Oct., 2003), pp. 1–5.

KagadeI *Simulation of the Production of Atomic Hydrogen in a Low–Pressure–Arc–Discharge–Based Source, Journal of Vacuum Technology*, vol. 19 (2001), pp. 1346–1352.

KagadeI *Suppression of Parasitic Backgating by Hydrogenation of Ion–Doped Gallium Arsenide Structures, Technical Physics Letters*, vol. 25, No. 7 (Jul., 1999), pp. 522–523.

KagadeI *Use of a New Type of Atomic Hydrogen Source for Cleaning and Hydrogenation of Compound Semiconductive Materials, Journal of Vacuum Technology*, vol. 16 (1998), pp. 2555–2561.

Semenov et al, *Gas–Discharge Sources with Charged–Particle Emission from the Plasma of a Hollow–Cathode Glow Discharge, Russian Physics Journal*, vol. 44, No. 9 (2001), pp. 977–986.

Soltanovich et al., *Study of Depth Distribution of Metastable Hydrogen–related defects in n–type GaAs, Physica B: Condensed Matter*, vol. 308–310 (Jul., 2001), pp. 827–830.

Tarasenko et al., *Application of KrCl excilamp for cleaning GaAs surface using atomic hydrogen, SPIE*, vol. 3274, pp. 323–330.

Leone, "Kinetic–Energy–Enhanced Neutral Etching", *Jpn. J. Appl. Phys.*, (1995), vol. 34, No. 4B, pp. 2073–2082.

Orlikovsky, "Plasma Processes in Micro– and Nanoelectronics Part 1. Reactive Etching", *Microelectronics* , (1999), vol. 28, No. 5, pp. 344–352.

Rousseau et al., "Pulsed microwave discharge: a very efficient H atom source", *J. Phys. D: Phys.*, (1994), vol. 27, pp. 2439–2441.

Popov et al., "Electron cyclotron resonance plasma stream source for plasma enhanced chemical vapor deposition", *J. Vac. Sci. Technol A*, (1989), vol. 7, No. 3, pp. 914–917.

Kroon, "Removal of Oxygen for the Si(100) Surface in a DC Hydrogen Plasma", *Jpn. J. Appl. Phys.*,, (1997), vol. 36, pp. 5068–5071.

Bardos et al., "Linear arc discharge source for large area plasma processing", *Appl. Phys. Lett.*, (1997), vol. 70, No. 5, pp. 577–579.

Lippert et al., "Soft Cleaning by in Vacuo Ultraviolet Radiation Combined with Molecular Hydrogen Gas before Molecular Beam Epitaxial Layer Growth", *J. Electrochem. Soc.*, (1995), vol. 142, No. 1, pp. 191–195.

Sugaya et al., "Low–Temperature Cleaning of GaAs Substrate by Atomic Hydrogen Irradiation", *Japanese Journal of Applied Physics*, (1991), vol. 30, No. 3A, pp. L402–L404.

Wolan et al., "Chemical reactions induced by the room temperature interaction of hyperthermal atomic hydrogen with the native oxide layer on GaAs(001) surfaces studies by ion scattering spectroscopy and X–ray photoelectron spectroscopy", *J. Vac. Sci. Technol.*, (1997), vol. 15, No. 5, pp. 2502–2507.

Korzec et al. "Characterization of a slot antenna microwave plasma source for hydrogen plasma cleaning", *J. Vac. Sci Technol.*, (1995), vol. 13, No. 4, pp. 2074–2085.

EPI MBE Production Group, Aug./Sep., 1994, Applications Note, "On the Use of Atomic Hydrogen in MBE".

Application Note, "Cracking Efficiency of the EPI Atomic Hydrogen Source", EPI, Jan., 1996, No. 1/96.

Livshits et al., "Dissociation of hydrogen molecules on Metal filaments in H ion sources", *Plasma Cource Sci. Technol*, (1994), pp. 465–472.

Hoflund et al., "Performance Characteristics of a hyperthermal oxygen–atom generator", *Mass. Sci. Technol.*, (1994), vol. 5, pp. 201–204.

Merfy et al., "Convenient source with a SHF–discharge in an elongated resonator for producing streams of hydrogen atoms" *Devices for Scientific Investigations*, (1979), vol. 5, pp. 121–122.

Geddes et al., "Dissocation for hydrogen in High frequency discharges", *Plasma Source Sci. Technol.*, (1993), vol. 2, pp. 93–99.

RF Gas Cracker/Reactives Atom Source—HD Series, The product of Oxford Applied Research.

Goodman et al., "Ar, $N_2$, and $Cl_2$ electron cyclotron resonance plasma measured by time–of–flight analysis: Neutral kinetic energies and source gas cracking", *J. Vac. Sci. Technol*, (1997), B vol. 15, No. 4, pp. 971–982.

Sherman, "In Situ removal of native oxide from silicon wafers", *J. Vac. Sci. Technol.*, B vol. 8, No. 4, pp. 656–657.

Samano et al., "An arc discharge hydrogen atom source", *Rev. Sci. Instrum.*, (1993), vol. 64, No. 10, pp. 2746–2752.

Gourrier et al., "Growth of Dielectric Films of Semiconductors and Metals Using a Multipole Plasma", *Thin Solid Films*, (1981), vol. 84, pp. 379–388.

Handbook of Ion Sources, Ed. by Bernard Wolf, CRC Press, (1995), pp. 32–34, 54–56, 61, 69–71, 222–223.

Gabovich et al., "Out of plasma with high concentration of concentration of charged particles into vacuum", *Journal of Technical Physics*, (1961), vol. 31, No. 9, pp. 1049–1055.

Ito et al., "Purification of diamond films by applying current into the plasma in the arc discharge plasma jet chemical vapor deposition technique", *J. Appl. Phys.*, (1995) vol. 77, No. 12, pp. 6536–6640.

* cited by examiner

METHOD AND APPARATUS FOR PRODUCING ATOMIC FLOWS OF MOLECULAR GASES

FIELD OF THE INVENTION

This invention relates to a method and apparatus for producing flows of molecular gas atoms, in particular an atomic hydrogen flow. The invention is particularly useful in the manufacture, of semiconductor devices and integrated circuits.

RELATED ART

The following is a list of references, which is intended for a better understanding of the background of the present invention.

1. Leone S., Jpn. J. Appl. Phys., 1995, 34. p. 2073–2082;
2. Orlikovsky A. A., Microelectronics, 1999, 28(5), p. 344–362;
3. Roussean A. et al., Pulsed microwave discharge: a very efficient H atom source, J. Phys. D: Appl. Phys., 1994, 27, p.2439–2441;
4. Popov O. A., Waldron H., J. Vac. Sci. Technol. A., 1989, 7(3), p. 914–917;
5. Kroon R., Jpn. J. Appl. Phys., 1997, 36, p. 5068–5071;
6. Bardos L., Barankova H., Berg S., Appl. Phys. Lett., 1997, 70(5), p. 577–579;
7. Lepert G., Thieme H. J., Osten H. J., J. Electrochem. Soc. 1995, V. 142. 1, p. 191–195;
8. Sugaya T., Kawabe M., Jpn. J. Appl. Phys. 1991, 30(3A), p. L402–L404;
9. Wolan J. P., Mount C. K., Hoflund G. B., J. Vac. Sci. Technol., A., 1997, 15(5), p. 2502–2507;
10. D. Korzec et al., J. Vac. Sci. Technol., A, 13(4), 1995, p. 2074–2085;
11. U.S. Pat. No. 5,693,173;
12. Applications Note. EPI MBE Production Group. August/September, 1994;
13. Applications Note. EPI MBE Production Group. Jan. 1, 1996;
14. Livshits A. I., Balghiti F. El., Bacal M., Plasma Source Sci. Technol., 1994, 3, p. 465–472;
15. Hoflund G. B., Weaver J. F., Meas. Sci. Technol. 1994, 5, pp. 201–204;
16. Merfy E., Brofy D., Convenient source with a SHF-discharge in an elongated resonator for producing streams of of hydrogen atoms, Devices for Scientific Investigations, 1979, 5, p. 121–122;
17. Geddes J. et al., Plasma Source Sci. Technol., 1993, 2, p. 93–99;
18. RF Gas Cracker/Reactive Atom Source—HD Series, The product of Oxford Applied Research;
19. U.S., Pat. No. 5,336,533:
20. Goodman R. S., Materer N., Leone S. R., J. Vac. Sci. Technol., B., 1997, 15(4), p. 971–9982;
21. Sherman A., J. Vac. Sci. Thechnol., B, 1990, 8 (4), p.656–657;
22. Samano E. C. et al., Rev. Sci. Instrum., 1993, 64(10), p.2746–2752;
23. Goorrier S. et al., Thin Solid Film, 1981, 84, p. 379–388;
24. RU2088056;
25. Handbook of Ion Sources, Ed. by Bernhard Wolf, CRC Press, 1995, p.544;
26. Gabovich M. D., Pasechnik L. L., Dozovaya E. A., "Output of plasma with high concentration of charged particles into vacuum", Journal of technical physics, 1961, V. 31, No. 9, pp. 1049–1055;

27. Ito M., Yamamato M., Nakamura S., Hattori T., "Purification of diamond films by applying into the plasma stream in the cathode arc discharge plasma jet chemical vapor deposition technique", J. Appl. Phys., 1995, 77(12), pp.6636–6640.

BACKGROUND OF THE INVENTION

The manufacture of semiconductor devices and integrated circuits utilize the treatment of semiconductor structures in aqueous chemical solutions (the so-called "wet" methods) and in plasma of various gases ("dry" methods). Lately, there has been significant increase in the use of dry methods as compared to that of wet methods, and treatment in plasma is being replaced by treatment in "remote" plasma.

Dry treatments of semiconductor structures used in the industry utilize known sources of plasma and particles beams based on various configurations of radio-frequency (RF) discharge [2,3], microwave discharge under the condition of electron cyclotron resonance (ECR) [2, 4], glow and arc discharges of direct current [5,6].

A dry treatment technique based on the use of a flow of neutral kinetically enhanced chemically active particles (atoms, radicals and excited particles), and particularly, a flow of atomic hydrogen, has also been developed [1]. This technique is characterized by the minimal level of introduced defects and contaminations, and a high degree of the reproducibility and controllability of a treatment process, and is therefore considered as a perspective technology in the manufacture of semiconductor devices with critical dimensions less than 0.18 $\mu$m. The successive realization of this technique and provision of high rates of treatment of semiconductor wafers requires sources of particles that form flows of hot (E<10 eV) neutral particles of high intensity ($10^{15}$–$10^{16}$ $cm^{-2}s^{-1}$) at a gas working pressure of less than $10^{-2}$ Pa in a vacuum camera. However, the sources of neutral chemically active particles were less developed, as compared to the sources of plasma and charged particles.

Mostly developed sources of the kind specifies are sources of atomic hydrogen. The production of hydrogen atoms utilizes several effects as follows:

- dissociation of molecules of hydrogen while heating a gas, for example, by laser emission [1],
- dissociation by means of high-energy photons, for example, in the UV spectral range [7],
- dissociation of molecules on a heated metal surface [8],
- dissociated adsorption of molecules followed by electron-stimulated desorption of atoms [9], and
- dissociation by electron impact [10].

In the atomic hydrogen sources based on the dissociation of hydrogen on a heated metal surface [11, 12], a dissociator is usually implemented either as a spiral-like tungsten wire heated by the electric current passage therethrough, or as a metal tube heated by electron bombardment. Molecules of hydrogen adsorb on the heated metal surface and dissociate into atoms, which can then leave the surface either as atoms, or, after the recombination, as molecules. Desorption results in the formation of a flow of particles composed of a mixture of atoms and molecules of hydrogen. The effectiveness of such sources at a working pressure of about $10^{-2}$ Pa is limited to 3% [12] or 15% [13], and, being defined by a sticking coefficient of molecule, does not exceed 25% [14]. Effectiveness of the sources significantly reduces with the increase of the pressure of hydrogen in the source. This prevents formation of intensive flows of atomic hydrogen. The density of atoms' flow in such a source is typically about $10^{14}$ $cm^{-2}s^{-1}$. Additionally, this source suffers from incapability of obtaining hot atoms, because of a low temperature of the heated metal surface (~2000 K).

An atomic hydrogen source based on electron-stimulated desorption of atoms enables formation of atom' flow with the flow density not exceeding $10^{14}$ $cm^{-2}$ $S^{-1}$ [9, 15] and utilize several sequential physical processes. Initially, the dissociated adsorption of hydrogen molecules takes place on the outer surface of a metal membrane. Then, the atoms diffuse through the membrane, and propagate onto the inner surface of the membrane (in a vacuum). Thereafter, if the atoms are not subjected to any external effect, they will associate into molecules and desorb into vacuum, thereby forming a flow of molecular hydrogen. In order to cause desorption of the atoms from the membrane's surface, the known effect of stimulated desorption under electron bombardment is used. This results in the formation of a flow composed of hydrogen atoms and molecules. Estimations have shown that the atomic hydrogen source of this kind enables obtaining a flow of hot atoms with the energy of 1 eV [9]. However, the effectiveness of such an atomic hydrogen source is limited by a small cross-section of electron-stimulated desorption of atoms. Hence, in order to obtain an atom flow of $10^{14}$ $cm^{-2}s^{-1}$, a wide-aperture electron beam with a high current density (more than 10 $mAcm^{-2}$) has to be used. This, in turn, requires using a thermionic emitter of a large surface area heated to a temperature significantly higher than that required in a source utilizing a heated wire. This leads to an increase of the pollution of a semiconductor structure under treatment by tungsten vapor and other products of the desorption process. To provide further growth of the density of an atomic hydrogen flow, the density of the electron current has to be increased even more.

The most effective methods for producing atomic hydrogen are those utilizing dissociation of molecules by an electron impact. Various forms of gas discharge are usually employed in these methods. The techniques of controlling the parameters of gas discharge plasma are well developed, and therefore conditions for effective dissociation of molecules in plasma can be realized. Hot atoms can be obtained by using the dissociation of molecules by electron impact. The dissociation of a molecule into one or two hot atoms is possible in the case, when electron interacting with this molecule has energy higher than the energy required for the molecule dissociation. The transition of the molecule from a highly excited stated, caused by the electron impact, is followed by the molecule dissociation and a partly transform of the redundant energy of electron excitation into kinetic energy of atom(s).

Various sources of this kind have been developed, such as sources of radicals and atomic hydrogen based on radio-frequency discharge [3, 16, 17, 18], microwave discharge under the ECR conditions [19], DC glow discharge [20], and DC arc discharge [21]. Although all these sources are practically capable of creating intensive flows of atoms, they differ from each other in the extent of dissociation of molecules in the discharge. The known atomic hydrogen sources utilizing a gas discharge suffer from the following drawbacks:

An RF discharge based source [18] has a high working pressure, thereby limiting its technological application and impeding the use thereof in super-high-vacuum systems and systems with a relatively low exhaust rate, and consequently, reducing the possibility of obtaining hot atoms (since a high number of interactions between the atoms and molecules in a gas phase results in the reduction of the average energy of atoms). Additionally, this source is characterized by a high energy of ions in the plasma of RF discharge, which may lead to sputtering of the constructional elements of the source and contamination of the surface of a semiconductor structure under treatment, as well as radiation damage and charging of the structure during the ion bombardment thereof.

Sources of the kind utilizing microwave ECR discharge [19] are operable in a wide range of pressure, and are characterized by lower energy of the ions, as compared to that of the RF discharge based sources. Nevertheless, microwave ECR discharge based sources have a complicated construction of both a discharge cell and its power supply source. The need for a discharge cell that meets the specific requirements of geometry, and the need for a strong magnetic field in plasma impede the integration of these sources with standard vacuum equipment. The average energies of Ar, $N_2$ and $Cl_2$ atoms obtained with the ECR based source are about 0.04–0.45 eV [20].

An atomic hydrogen source based on a DC glow discharge is simpler than that of the RF and ECR discharge types. Reference is made to FIG. 1, illustrating this type of source [21]. A discharge cell used therein comprises a hollow cylindrical water-cooled cathode made of molybdenum, and a flat anode made of stainless steel. The cathode and anode are accommodated opposite to each other in the butt-ends of a cylindrical insulator made of aluminum oxide based ceramics. Molecular hydrogen $H_2$ is supplied into the discharge cell through an opening in the butt-end of the hollow cathode. The diameter of the output opening is 2.5 mm, which enables for maintaining the gas pressure drop between the discharge cell and a vacuum chamber. The pressure of hydrogen in the vacuum chamber is maintained at a level of 30 Pa, the pressure inside the discharge cell being about 300 Pa. When direct voltage is supplied to the electrodes, a hollow cathode discharge is ignited in the discharge cell. This discharge is characterized by the growing volt-ampere curve: the growth of the discharge current is followed by an increase of the discharge voltage. When discharge is operating, a flow composed of a mixture of molecular and atomic hydrogen emerges from the cell through an emitting aperture in the flat anode.

Typical values for the discharge current and discharge voltage are, respectively, 0.1 A (too low) and 600V (too high). High voltage leads to the high probability of contamination of a semiconductor structure under treatment by the cathode ion sputtering products, as well as the increased probability of defects formation in near-surface layers of the structure (as a result of ion bombardment thereof). Low values of the discharge current prevent obtaining a high degree of dissociation of molecules of hydrogen in discharge plasma. Additionally, an atomic hydrogen source of this kind can effectively operate only in a narrow range of working pressure values, both in the discharge cell and in the vacuum chamber, and is characterized by a high working pressure.

The electrodes' geometry used in the source of FIG. 1 provides for a short path of electrons in the volume of the discharge cell, which prevents the effective use of the entire electron energy on the processes of ionization of atoms (molecules) and the dissociation of molecules. Gas dissociation in a discharge cell can be increased by increasing the discharge current. However, in the case of a glow discharge, this causes a growth of discharge voltage and formation of cathode spots, which increases the probability of contamination and damages of the surface of a semiconductor structure.

It has been proposed [22] to overcome the above drawback of the glow discharge based source by using an arc discharge with heated electrode. The arc discharge has a falling volt-ampere characteristic, and the growth of discharge current is followed by a decrease of the discharge voltage. FIG. 2 illustrates the atomic hydrogen source [22] having a discharge cell formed of two electrodes, a pin-like cathode made of thorium-coated tungsten, and a cylindrical anode made of molybdenum, which is water-cooled during operation of the source. The cathode is by its one end supported in water-cooled holder, and by its free end, located in the vicinity of the anode, such that the space between the cathode and anode does not exceed 6.5 mm. A plate made with a conically shaped emitting aperture is located adjacent to the lower butt-end of the anode. The emitting aperture has the following geometry: a length of 1.2 mm, a minimal diameter of 0.4 mm and a solid angle of 30°. Such an emitting aperture allows for maintaining a large gas pressure drop between a vacuum chamber and the discharge cell. In operation, the discharge cell is placed in a transverse longitudinal magnetic field of 230G. The working pressure inside the discharge cell is $(15–25)\times10^2$ Pa, the pressure in the vacuum chamber being $10^{-1}–10^{-2}$ Pa. When a direct voltage is supplied to the electrodes, a glow discharge is first ignited in the discharge cell, which is then, as a result of a specific procedure, transformed into an arc discharge with a self-heating cathode. Transition from the glow discharge into arc discharge causes an increase in the discharge current by 100. Typical values of a discharge current and discharge voltage are, respectively, 15 A and 105V Such regime of discharge operating enables producing an intensive flow of atoms of hydrogen. This source, however, suffers from too high a working pressure of hydrogen in the discharge cell, and too narrow range of working pressure values. Due to the above geometry of electrodes, the following sequence of operations has to be followed when putting the source into operation: creating weak-current glow discharge in the cell at a starting pressure of $(20–25)\times10^2$ Pa; slowly increasing the discharge current and pressure of hydrogen to create the abnormal glow discharge; increasing the pressure up to $75\times10^2$ Pa to enable transformation into arc discharge with a heated cathode. Thereafter, the pressure is to be reduced to the working one, $(15–25)\times10^2$ Pa, to start the technological treatment. Moreover, the process should be controlled to prevent both the leaps of pressure and leaps of discharge voltage, to thereby avoid discharge variation from the working mode. Incapability of this source for operating at reduced pressure values renders it impossible for use in super-high-vacuum systems and systems with low pumping rate.

According to another technique [24], developed by the inventors of the present application, an atomic hydrogen source based on low pressure arc discharge, schematically illustrated in FIG. 3, comprises a thin-wall hollow cathode 1, a cylindrical anode 2, a flat cathode 3 formed with an emitting aperture 6, and a magnetic field source 4. A magnetic field produced by the magnetic field source provides a Penning discharge in the cell. The hollow cathode partly penetrates into the anode cavity 5, thereby causing creation of a magnetron discharge between the outer surface of the hollow cathode and inner surface of the anode. This magnetron discharge causes heating and creation of thermionic emission from the hollow cathode, thereby causing intensive injection of thermionic electrons into plasma. This source, however, does not provide a sufficiently high density of the output atomic hydrogen flow. Additionally, it is characterized by a short operational time with the same electrodes.

It have been known that effective gas ionization can be obtained by using such forms of gas discharge that utilize crossing electric and magnetic fields (E×H), i.e., magnetron and Penning discharges, as well as forms of gas discharge utilizing oscillation of electrons between cathodes, i.e. reflective discharge and discharge with hollow cathode [25]. Moreover, such a phenomenon as a plasma jet emerging from the region of a gas discharge into the source surrounding space through a small-diameter aperture has been known from the physics of gas discharge and techniques of plasma and charged particles sources [26]. This phenomenon is used for obtaining plasma flows [27].

SUMMARY OF THE INVENTION

There is a need in the art to facilitate the production of atomic particle flow by providing a novel source device for transforming a supplied molecular gas into an intensive flow of atomic particles.

The inventors have found that insufficient density of the atomic hydrogen flow obtained with the earlier source model [24] developed by them is caused by the fact that the hollow self-heating cathode (1 in FIG. 3) is too far from the flat cathode 3. As a result, the plasma density in the zone of emitting aperture is small, that zone of the discharge cell in which hydrogen atoms are mostly generated is at a large distance from the emitting aperture, and atoms on their way to the emitting aperture undergo a large number of collisions with the cold walls of the cell and recombine into molecules. The factor that the source quickly goes out of use is associated with the destroy of that part of the self-heating thin-wall hollow cathode which penetrates into the anode cavity. The hollow cathode is destroyed by ion sputtering, as well as by quick breaking of the electrode material due its over-heating caused by insufficient heat conductance through the thin walls of the hollow cathode.

The inventors take an advantage of the fact that the nature of the mechanisms of dissociation and ionization of molecules are close to each other, and propose obtaining a highly-dissociated gas using the forms of gas discharge utilizing crossing electric and magnetic fields (magnetron and Penning discharges), and forms of gas discharge utilizing oscillation of electrons between cathodes (reflective discharge and discharge with hollow cathode). Additionally, the inventors propose using a plasma jet as an auxiliary source of atomic particles. Experimental results have shown the possibility of realization of these proposals in a new method and device for producing an intensive flow of atoms.

The present invention provides for overcoming the above and other drawbacks of the convention techniques of the kind specified. The source of the present invention can be used for producing atomic hydrogen, nitrogen or oxygen, as well as for producing excited atoms of atomic gas, such as argon or xenon.

According to the present invention, intensive flows of atoms of molecular gases and excited atoms of atomic gases are obtained from plasma of gas discharge. The present invention utilizes several original approaches for solving the problem of optimizing the parameters of the plasma and geometry of the discharge cell's electrodes, as well as for satisfying the requirements of the sources of neutral particles.

There is thus provided according to one aspect of the present invention, a method of producing an intensive flow of atoms from an input flow of a molecular gas with a source comprising a discharge cell connectable to a direct current source and defining at least one emitting aperture through which the flow is output from the cell, the method utilizing ignition of a gas discharge in said discharge cell and dissociation of the gas molecules by electron impact, and comprising:

providing ignition of the gas discharge of a complex type composed of a main discharge and two auxiliary discharges of different types ignited in substantially coinciding zones of the discharge cell, wherein said main discharge is an arc Penning discharge ignited in a zone of the vicinity of said at least one emitting aperture, the first auxiliary discharge is a magnetron discharge with heated cathode, and the second auxiliary discharge is one of the following: a Penning discharge, and a Penning discharge with hollow cathode, the dissociation of the gas molecules being thereby carried out in said complex discharge and resulting in creation of the flow of hot and thermally atoms.

The hot atoms are atoms with the energy of about 0.1–10 eV, and the thermally atoms are those with the energy less than 0.1 eV.

According to another aspect of the present invention, there is provided a source device for producing an intensive flow of atomic or excited particles, the device being connectable to a direct current source and comprising an electrodes' arrangement and a magnetic field source, wherein the electrodes' arrangement comprises a cylindrical anode and a multiple-electrode cathode which are axially aligned and define an inter-electrode space for a longitudinal magnetic field region, wherein the multiple-electrode cathode comprises a first elongated self-heating electrode, a second flat reflective electrode in which at least one opening forming at least one emitting aperture is made, and a third reflective electrode the first electrode being electrically connected to the third electrode, when the device is put in operation;

the first self-heating elongated electrode is axially aligned with the cylindrical anode and penetrates into the anode cavity at a predetermined distance;

a butt-end of the first electrode located inside the anode cavity, a part of the surface of the second electrode opposite a butt-end of the first electrode and the cylindrical anode form a cell of a main arc Penning discharge ignitable in at least one zone in the vicinity of said at least one emitting aperture;

the first electrode and the cylindrical anode form a cell of a first auxiliary discharge, which is a magnetron discharge with heated cathode; and the second and third reflective electrodes and the cylindrical anode form a cell of a second auxiliary discharge, which is one of the following: a Penning discharge, and a Penning discharge with hollow cathode.

The invented method for obtaining intensive flows of atoms provides significant prevalence of the rate of generation of atomic particles in plasma of gas discharge by means of molecules dissociation by electron impact (bombardment), over the rate recombination of atoms into molecules. The flow of atomic particles is separated from plasma of a combined form of arc discharge with heated cathode. A region of dense plasma is created in a discharge cell, wherein this region is characterized by a high concentration of fast, as well as thermionic electrons, emitted from the surface of the heated cathode. The dense plasma region is located in the vicinity of an emitting aperture in a flat cathode, through which atoms forming the flow are output. The probability of atoms' recombination into molecules on the surface of the emitting aperture can be reduced by making the emitting aperture in the foil of a refracting metal. Such a refractory metals may be Re, W, Mo, or WRe alloy. This results in that the surface of the cathode in the vicinity of the emitting aperture is heated up to a high temperature by ion bombardment. The main Penning discharge with self-heated electrode (cathode) is used to form the dense plasma region. To maintain the main discharge and effective heating of the self-heated electrode, two auxiliary discharged with somewhat less dense plasma are used: the magnetron discharge with heated cathode and Penning discharge with hollow cathode (or Penning discharge without hollow cathode). The auxiliary discharges operate at a certain distance from the emitting aperture. A molecule gas is input into the discharge cell from a side opposite to the emitting aperture, and enters the regions (zones) of the auxiliary discharges, where a part of molecules dissociate into atoms. Most of these atoms recombine on cold walls of the electrodes of the discharge cell, and an insignificant part of the atoms, that has not undergone a large number of interactions with the cold walls, is output into the flow of atoms. The entire gas that has passes the zones of the auxiliary discharges, enters the zone of the main discharge, where the most of the remaining molecules dissociate into atoms, which are output into the flow substantially without losses associated with recombination.

Thus, the main idea of the present invention consists of creating the region of dense plasma in the vicinity with a high concentration of fast electrons in a small "point-like" volume in the vicinity of the emitting aperture. In this region, conditions for a high rate molecule' dissociation and a small rate atom' recombination are provided, and the entire gas is pumped through this region.

To even more increase the effectiveness of the source (i.e., increase of the degree of gas dissociation), additional dissociation of molecules can be provided in the region of atoms' flow emerged from the source. To this end, a plasma jet can be formed propagating into vacuum through the emitting aperture. Fast thermionic electrons coming from the self-heated electrode oscillate in the plasma jet and produce effective dissociation of the remaining molecules. Gas dissociation in the region of the main discharge and in the plasma jet by the fast thermionic electrons leads to the increase of the part of hot atoms in the entire flow of particles emerging from the source. By supplying an atomic gas into the discharge cell, flows of excited atoms can be obtained.

The present invention can be used for treatment of a semiconductor structure aimed at modifying the properties of surface and/or near-surface layers of the structure. For example, this can be used for cleaning the surface of a semiconductor structure from oxides, organic, metal and other contaminations, as well as for residual photoresist removal; hydrogenation of near-surface layers of a semiconductor structure; assisting in thin-film deposition processes; treatment of semiconductor structures based on mono-crystal, poly-crystal and amorphic substrates and/or layers fabricated from elementary semiconductors, semiconductor compounds and/or solid solutions.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
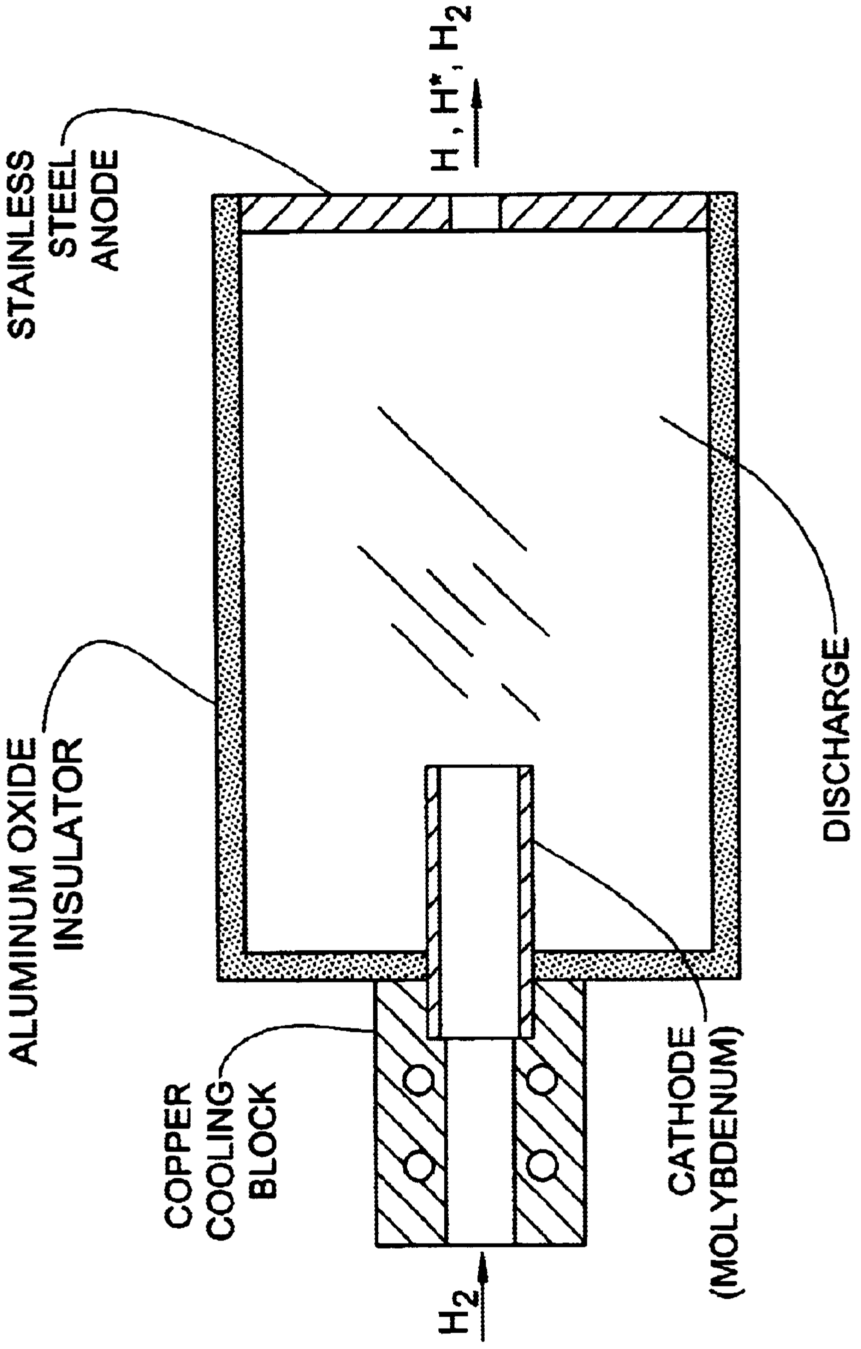
FIG. 1 (PRIOR ART)
FIGS. 1 to 3 illustrate prior art sources of atomic hydrogen.

The operation of the atomic gas source of the present invention is based on the use of the most productive method of producing atomic particles: the generation of atomic hydrogen (or other gas) in plasma of gas discharge. In this connection, the following should be understood:

The major parameter characterizing effectiveness of the source is the degree of gas dissociation in discharge plasma. The major channel for obtaining atomic hydrogen in gas discharge is the dissociation of molecules of hydrogen by electron bombardment, and the main channel for losses is the recombination of atoms on cold walls (electrodes) of the discharge cell. Hence, the degree of gas dissociation (concentration of atoms in plasma) is defined by a balance between these processes.

The present invention provides for optimizing the parameters of gas-discharged plasma and the geometry of electrodes of the discharge cell so as to ensure that the rate of atom generation significantly prevails over the rate of their recombination. The rate of generation is determined by the concentration of molecules, concentration of electrons, their energy distribution and the length of electrons' path up to reaching the anode. The higher the values of these parameters, the higher the number of dissociation effects, and the higher the degree of gas dissociation. From this point of view, a part of the electron current in the entire discharge current and the temperature of electrons should be increased, and such a geometry of electrodes should be provided so that the electron interactions on the way to the anode cause losses in the maximal amount of energy received by the electrons at the cathode potential drop. The rate of atom generation is determined by a ratio between the volume of a discharge cell and the surface area of cold electrodes, as well as by a coefficient of atom recombination. In this connection, the volume of a discharge cell and the coefficient of atom recombination have to be, respectively, increased and decreased.

Another important parameter affecting the effectiveness of the source is a coefficient characterizing the probability of separating atoms of plasma into the formed flow. Here, the configuration and dimensions of an emitting aperture are of importance, and should be optimized so as to ensure minimal losses of atoms.

Additionally, technological parameters of the source should also be taken into consideration. These parameters are affected by the following: The intensity of a flow of atoms is determined by the flow rate of gas pumped through the source, and the degree of gas dissociation in the discharge. The energy of hydrogen atoms increases with the increase of electrons' energy that produce bombarding dissociation, and decreases with the growth of the number of interactions of atoms with other particles (including also low-energy molecules) and with the walls of the cell, until the atoms emerge from the cell into a vacuum. The working pressure in the discharge cell and the range of pressure values at which the efficiency of the source is maintained at a desired level, are determined by the effectiveness of maintaining the discharge process in the cell, or in other words, by the coefficient of the use of electron energy in ionization processes. Since the production of neutral atoms occurs with the direct participation of charged particles, the controllability of the process of atom production is defined by the controllability of the gas discharge parameters. Such source parameters as complexness and price depend on the type of discharge used in the source.

Yet another important parameter characterizing the source is the contamination of the formed flow of atoms by admixture particles that usually are the products of cathode erosion. The latter can be avoided by preventing the surface of cathode from the cathode spots' formation, by reducing a part of ion current in the discharge current, and by decreasing the energy of ions to reduce sputtering.

Figure 2:
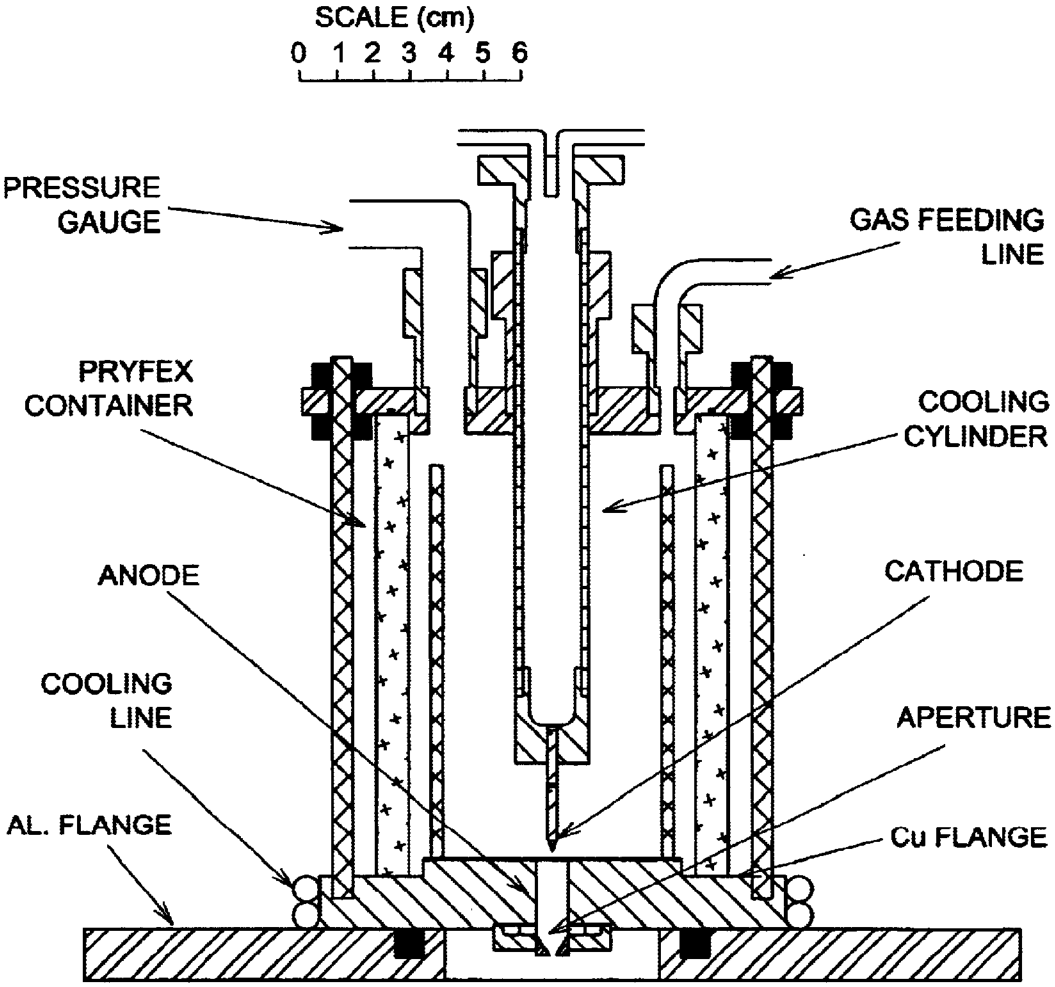
FIG. 2 (PRIOR ART)
Figure 3:
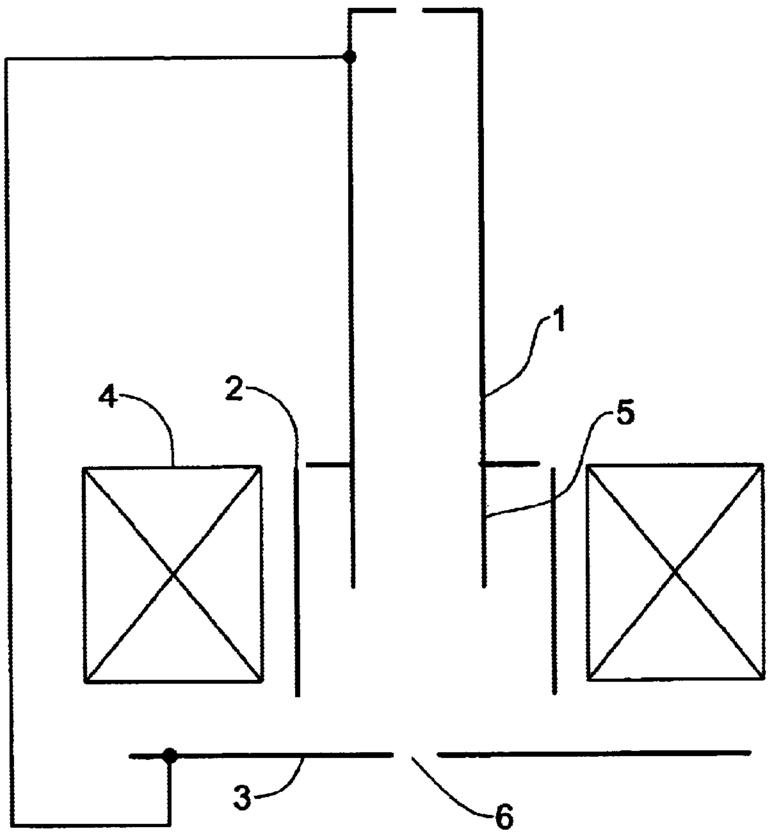
FIG. 3 (PRIOR ART)

More specifically, the present invention is used for producing atomic hydrogen and is therefore described below with respect to this application. FIGS. 1–3 described above relate to the prior art sources of atomic hydrogen.

Figure 4A:
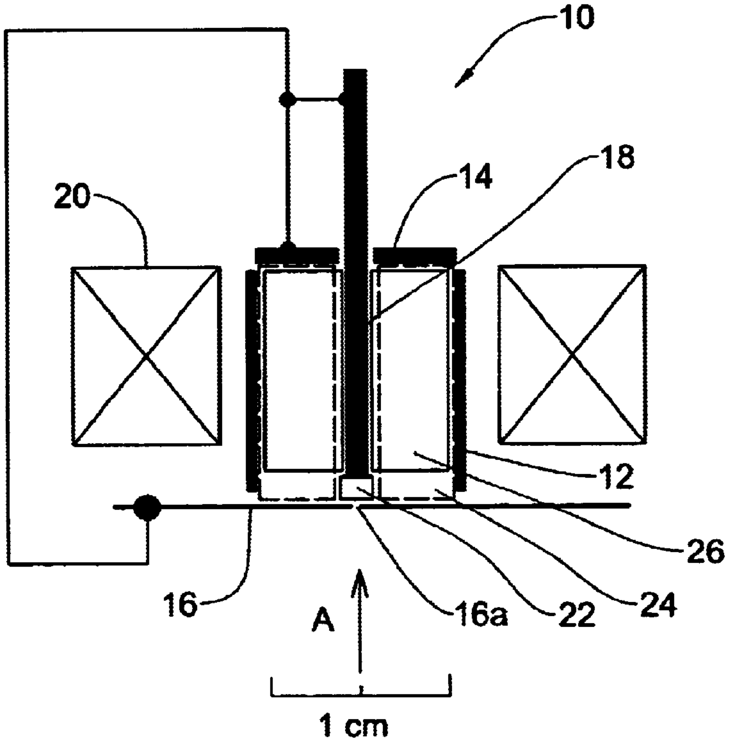
FIG. 4A illustrates an example of the construction of a discharge cell according to the invention.

Referring to FIG. 4A, there is illustrated one example of a discharge cell 10 according to the invention. The discharge cell has an electrodes' arrangement including a cylindrical water-cooled anode 12, and a multiple-electrode cathode composed of a first self-heating thermo-insulated rod-like electrode 18, second and third flat water-cooled cathode-reflectors 16 and 14, the electrode 18 being electrically connected to the cathode-reflectors or cathodes 14 and 16. The discharge cell 10 is located in a magnetic field B of a permanent magnet 20 (e.g., made of samarium-cobalt), which is preferably a ring-like magnet surrounding the cylindrical anode 12, and which is cooled together with the anode.

The electrodes' arrangement defines an inter-electrode space for a longitudinal magnetic field region. The rod-like electrode 18 (e.g., tungsten rod of about 2 mm in diameter) extends along the axis of the electrodes' arrangement above an emitting aperture 16*a* formed by an opening made in the electrode 16. The cathodes 14 and 16 are made of a magnetic material, which is a requirement for the magnetic field concentration inside the discharge cell, and the anode 12 is made of a non-magnetic material (e.g., stainless steel). Both cathodes 14 and 16 are exposed to the same potential. The cathode 14 also serves for mechanical fixation of the self-heating electrode 18. Gas inlet is carried out through an axial opening in the cathode 14. Atomic hydrogen flow is output through the emitting aperture 16*a*. Thermo-insulation of the self-heating electrode 18 is provided due to its high length and weak heat contact with the cathode 14. The length of the rod 18 is selected to provide the rod penetration into the anode cavity at a distance of about ¾ of the cavity length (height).

The emitting aperture 16*a* is implemented in the following manner: An opening of 2–3 mm in diameter is made in the water-cooled cathode 16, and is then covered at its side facing the discharge cell, by a thin plate (not shown) made from a refractory material (e.g., Re, W, Mo or WRe alloy) and having an axial opening of a required diameter (usually less than 1 mm). The thin film plate is fixed to the reflective cathode 16, for example by means of contact welding. The thickness of the plate is selected so as to provide heating of the aperture by ion bombardment up to the temperature ensuring that the rate of dissociation on the metal surface exceeds the rate of recombination (temperature more than 1500° C.).

Figure 4B:
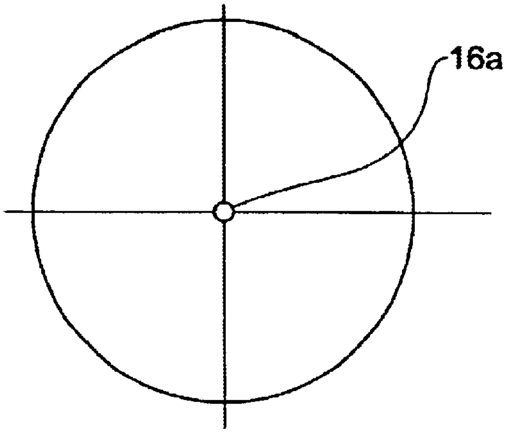
FIGS. 4B to 4D illustrate three examples, respectively, of the emitting aperture arrangement suitable to be used in the discharge cell of the present invention.
Figure 4C:
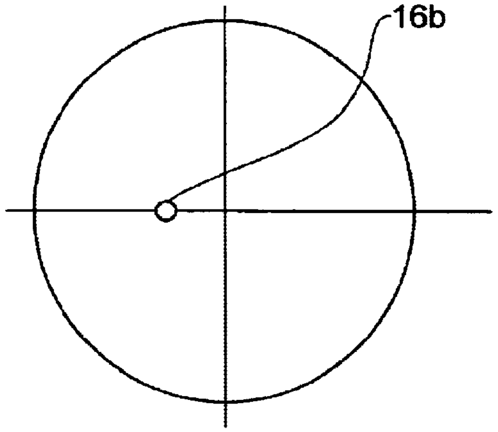
Figure 4D:
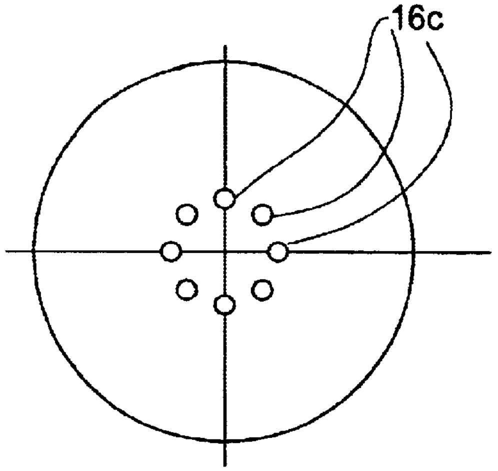

As shown in FIG. 4B, the emitting aperture 16*a* may be located at the central axis of the discharge cell, as in the cell 10. FIGS. 4C and 4D exemplify another possible emitting aperture arrangements. In the example of FIG. 4C, a single emitting aperture 16*b* is provided being formed by an opening in the reflective cathode 16 spaced-apart from the central axis of the discharge cell. It should be noted that an array of emitting apertures may be provided being located at different radial distances from the anode's axis (i.e., axis of the discharge cell). In the example of FIG. 4D, emitting apertures 16*c* are arranged in a circular array, being located in a spaced-apart relationship at the same radial distance from the cells' axis. The aperture or apertures may be formed of opening(s) with inclined walls, thereby eliminating direct observation of the surface of the self-heating electrode from a treatment plane where a treated sample is located.

Turning back to FIG. 4A, the discharge cell 10 presents an axially symmetric structure, which when put in operation provides for ignition therein of three types of gas discharge: one main discharge and two auxiliary discharges. The butt-end of the self-heating electrode 18, a part of the surface of the cathode-reflector 16, and the cylindrical anode 12 form together a cell (zone) 22 of the main arc Penning discharge functioning in the vicinity of the emitting aperture 16*a*. The flat cathodes 14 and 16 and cylindrical anode 12 form together a cell 24 (shown in solid lines) of the auxiliary Penning discharge. The self-heating cathode 18 and cylindrical anode 12 form together a cell 26 (shown in dashed lines) of the auxiliary magnetron discharge with heated cathode. As shown, the zones 24 and 26 of the auxiliary discharges substantially coincide: the auxiliary magnetron discharge occupies the inner part of the cylindrical anode where the to the rod-like self-heating electrode is located, and the auxiliary Penning discharge occupies the entire inner cavity of the cylindrical anode.

Atomic hydrogen is generated in the zones of auxiliary discharges. Experiments have shown that only a small part of these atoms can leave the discharge cell, while the larger part of atoms recombines into molecules on the cold walls of the discharge cell. The main discharge, i.e., arc Penning discharge, functioning in the vicinity of the emitting aperture 16*a*, serves as the main source of supplying atoms that form the output flow. In the zone 22 of the main discharge, plasma of the highest density is formed, that contains the maximal amount of electrons that were emitted from the self-heating element and the reflective cathode and passed the cathode potential drop. These high-energy electrons perform the effective dissociation of molecules in the vicinity of the emitting aperture thereby generating high amount of hot and thermally atoms. The small-volume zone 22 of the main discharge created in the vicinity of the emitting aperture 16*a*, in addition to the above features, is characterized by that a high density of power enter this region and the entire amount of gas leaving the discharge cell is pumped through this region. Hence, the present invention provides for a point-like source, wherein the entire amount of gas is pumped through that "point", which is entered with the maximal density of power.

Figure 4E:
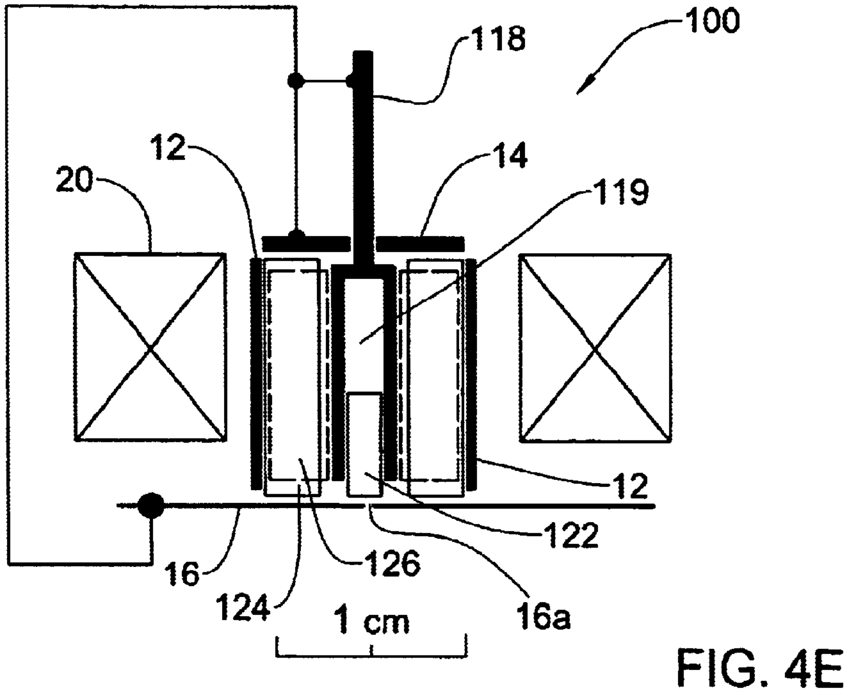
FIGS. 4E and 4F illustrate two more examples, respectively, of the construction of a discharge cell according to the invention.

Reference is made to FIG. 4E, illustrating a discharge cell 100 according to another example of the invention. The cell 100 is constructed generally similar to the above-described discharge cell 10, but has a somewhat different design of a self-heating element 118. The same reference numbers are used for identifying those components that are common in the discharge cells 10 and 100. In the discharge cell 100, the distal end of the self-heating electrode 118 by which it faces the emitting aperture 16*a* is formed with a cavity 119 of a length equal to or slightly less than the height of the cylindrical anode 12. The self-heating cathode cavity 119 is made with thick walls to thereby increase the mean-cycle-between failures times. The thickness of the walls of the hollow cathode should preferably be of about 0.5–2 mm, thereby providing a required temperature and sufficient mechanical strength of the self-heating electrode. As a result, the main arc Penning discharge with the self-heating hollow cathode 118, rather than the main arc Penning discharge as in the example of FIG. 4A, is ignited in a zone 122 the vicinity of the emitting aperture 16*a*. Substantially coinciding zones 124 (shown in solid lines) and 126 (shown in dashed lines) are zones of, respectively, auxiliary Penning discharge and auxiliary magnetron discharge with heated cathode.

Figure 4F:
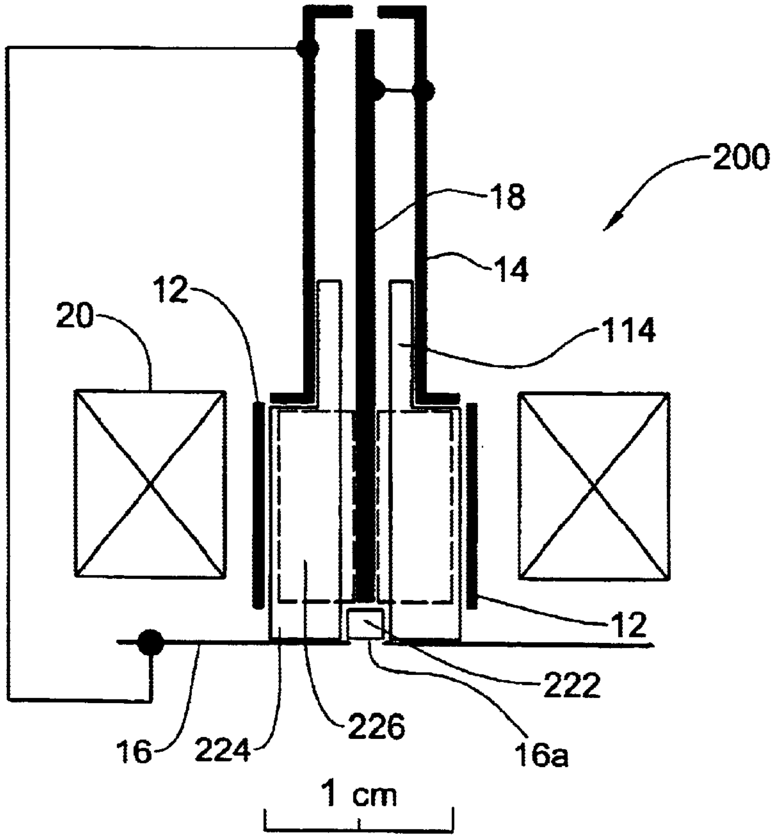

FIG. 4F illustrates a discharge cell 200 according to yet another example of the invention. The cell 200 has an electrodes' arrangement composed of a cylindrical anode 12, a reflective cathode 14 having a cavity 114 and thereby forming a hollow cathode, a reflective cathode 16, and a rod-like thermo-insulated self-heating electrode 18. The electrodes' arrangement is located in the magnetic field created by the permanent magnet 20, and forms a discharge cell with a hollow cathode. The rod-like thermo-insulated self-heating electrode 18 is located inside the hollow cathode 14 and is electrically connected to the cathode 14. The electrode 18 extends along the axis of the electrodes' arrangement above the emitting aperture 16*a*. In this construction, the provision of the cavity 114 allows for ignition of the discharge with hollow cathode. Zones 222, 224 and 226 are zones of, respectively, the main arc Penning discharge cell, an auxiliary Penning discharge with hollow cathode, and the auxiliary magnetron discharge. Thus, the discharge cell 200 presents an axially symmetric structure, in which can be ignited the main arc Penning discharge, and two auxiliary discharges: the magnetron discharge and Penning discharge with hollow cathode.

It should be understood that the constructional difference between the discharge in which the auxiliary Penning discharge with hollow cathode can be ignited (FIG. 4F), and the discharge cell in which such a discharge cannot be ignited and is replaced by the auxiliary Penning discharge (FIGS. 4A and 4E), consists of a change in the inner diameter of a cavity of hollow cathode (114 in FIG. 4F). This is associated with the following: Depending on the distance (gap) between the surface of the self-heating electrode and the inner wall of the hollow cathode, plasma with a given concentration either penetrates into the hollow cathode or not. If this gap is less than 1 mm, plasma with concentration characterizing this discharge cannot penetrate into the cavity, and when the gap is higher than 2 mm, plasma penetrates into the cavity. For example, with the diameters of the self-heating electrode and the hollow cathode cavity being, respectively, 2 mm and more than 4 mm, plasma penetrates into the hollow cathode. This leads to ignition of the auxiliary Penning discharge with hollow cathode. When the self-heating electrode and the hollow cathode have diameters of 2 mm and less than 3 mm, respectively, plasma does not penetrates into the hollow cathode thereby resulting in the Penning discharge (i.e., without hollow cathode). In the latter case, the cavity that anyway exists is required solely to provide heat insulation of the self-heating electrode (i.e., fixation of the self-heating electrode sufficiently far from a region where it can be heated by the gas discharge). Hence, from the constructional point of view, the discharge cells described above differ from each other by the diameter of the hollow cathode cavity.

Figure 5A:
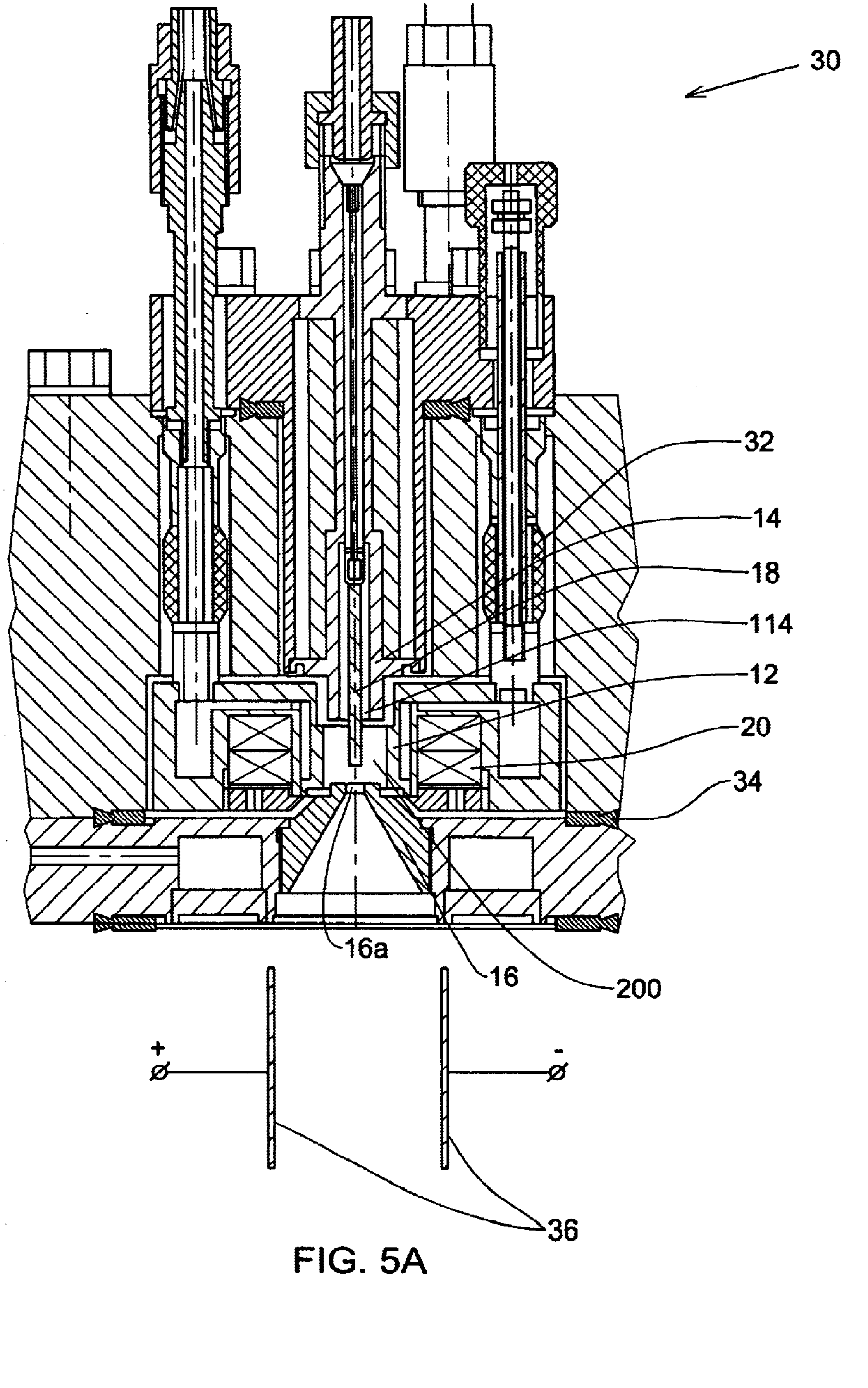
FIG. 5A illustrates a cross-sectional view of an atomic hydrogen source utilizing the discharge cell of FIGS. 4A and 4B.
Figure 5B:
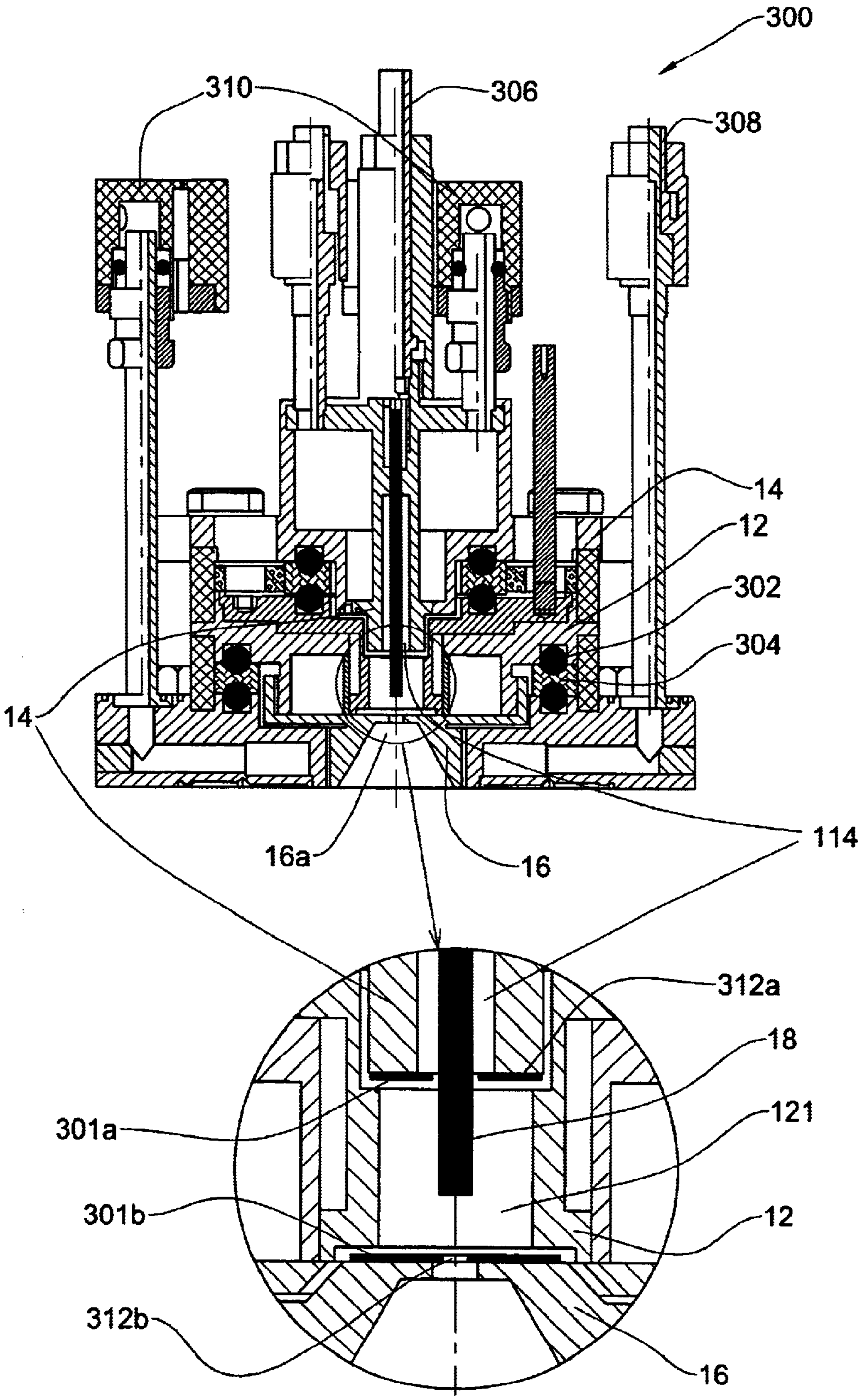
FIG. 5B illustrates a cross-sectional view of an atomic hydrogen source utilizing a discharge cell of a somewhat different design as compared to the discharge cell of FIG. 5A, preventing ignition of an auxiliary Penning discharge with hollow cathode and enabling obtaining of a "hot" emitting aperture.

Reference is now made to FIGS. 5A and 5B showing two examples of an atomic hydrogen source according to the invention.

An atomic hydrogen source 30 (FIG. 5A) is enclosed in a housing made of stainless steel using a ceramic insulator 32 and copper gasket 34, and comprises the discharge cell 200. This source is suitable for use in super-high-vacuum systems (the remaining pressure level in a vacuum chamber being more than $10^{-8}$ Pa. If the source is intended for use in systems with a non-super-high-vacuum system, as described below, organic materials (fluoro- and organic plastic, viton) may be used as insulators and gaskets. The atomic hydrogen source 30 is connectable to a direct current source (not shown). The atomic hydrogen source 30 operates in the following manner. A working gas (super-pure hydrogen) is supplied into the discharge cell 200 through an opening in the butt-end of the hollow cathode 14. Gas flow rate Q varies in the range of 2–60 atm·cm$^3$·min$^{-1}$, while pressure in the technological chamber is about $10^{-3}$–$10^{-1}$ Pa. To provide the discharge ignition, the open-circuit voltage of the order of 0.8–1 kV is required. When voltage is supplied to the electrodes at a given value of discharge current in the cell, a glow discharge is first ignited. Thereafter, for less than a second, ion bombardment of the self-heating electrode 18 causes its heating to a temperature of a noticeable thermionic emission, electrons are injected into plasma and the discharge is transformed into an arc-stage, while the source is put into a working mode. Working values of voltage and current have to be about 200V and 2.5 A, respectively.

As described above, transition from the auxiliary Penning discharge with hollow cathode to the auxiliary Penning discharge can be achieved by reducing the diameter of the cavity 114. Another way of this transition to the auxiliary Penning discharge without hollow cathode, while using the electrodes' arrangement of the discharge cell 200 is illustrated in FIG. 5B.

An atomic hydrogen source, generally designated 300, utilizes a discharge cell 200', which is designed generally similar to the discharge cell 200 of FIG. 4F, namely, comprising the reflective electrode 14 with cavity 114 (hollow cathode), reflective electrode 16, and the rod-like self-heating electrode 18 penetrating into the anode cavity 12l, but has additional discs 301*a* and 301*b* made of a refractory metal, the purpose of which will be described below. The electrodes are packed by viton washers, generally 302, via ring-like insulators, generally at 304, made of organic materials (fluoro- and organic plastic). Hydrogen is fed through a sleeve (pipe) 306, and the atomic hydrogen flow is output through the emitting aperture (not shown here) in the cathode-reflector 16. Water cooling of the source is carried out via a sleeve 308 and dielectric connectors 310. The source 300 is suitable for use for non-super-high-vacuum systems (the level of residual pressure in vacuum chamber more than $10^{-6}$ Pa), where organic insulators and viton sealing washers can be used.

The discs 301*a* and 301*b* are connected to, respectively, the reflective electrodes 14 and 16 by means of contact welding, and have central openings 312*a* and 312*b*, respectively. The diameter of the opening 312*a* is larger than that of the self-heating electrode 18 on about 0.2–0.6 mm. This prevents the plasma penetration into the cavity of the hollow cathode, and prevents ignition of an auxiliary discharge with hollow cathode. The opening 312*b* in the disc 301*b* is located above the opening in the cathode 16. During the discharge operation, the central part of the disc 301*b* is heated by ion bombardment and forms a "hot" emitting aperture. Hence, in the example of FIG. 5B, the provision of the disc 301*a*, transition to the auxiliary Penning discharge (from the auxiliary Penning discharge with hollow cathode) can be obtained. The provision of the disc 301*b* provides for obtaining the "hot" emitting aperture.

A flow of particles composed of a mixture of atomic and molecular hydrogen emerges from the discharge cell through the emitting aperture 16*a* in the reflective cathode 16. In a general case, the flow density distribution of atomic hydrogen is determined by the cosine law. Together with the neutral particles, a small amount of charged particles emerge from the emitting aperture (not more than 0.03% of the discharge current). These particles can be completely removed from the flow, if required. To this end, a charged particles filter (36 in FIG. 5A), for example an electrostatic or magnetic filter, can be used.

The following table exemplifies the technical characteristics of the experimental atomic hydrogen source utilizing the discharge cell 10 of FIG. 4A. The source was enclosed in a housing having a diameter of not less than 60 mm and a height of 180 mm.

| Discharge type | Combined form discharge with heated cathode |
|---|---|
| Discharge ignition voltage (V) | 800–1000 |
| Discharge voltage (V) | 50–400 |
| Discharge current (A) | Direct current of 0.1–2.5 |
| Full current of charged particles emerging the discharge cell having no electrostatic filter (% of discharge current) | Not exceeding 0.03 |
| Working gas | Hydrogen |
| Hydrogen pressure in the discharge (Pa) | 0.5–250 |
| Hydrogen pressure in the treatment zone (Pa) | $10^{-3}$–$10^{-1}$ |
| Hydrogen flow rate (atm.cm$^3$/min (sccm)) | 2–60 |
| Full flow of particles emerging from the source (s$^{-1}$) | $10^{18}$ – $1.7 \times 10^{20}$ |
| Flow of atomic hydrogen emerging from the source (10 cm from source) (cm$^{-2}$s$^{-1}$) | $10^{13}$–$10^{16}$ |
| Extent of the flow atomization (%) | 1–50 |
| Energy of hydrogen atoms (estimated data), eV | 0.1–1.5 |

The experiments have shown that contamination of the surface of the semiconductors structure treated by atomic hydrogen treated is at a level non-detectable by Auger electron spectroscopy.

In the general case, the concentration of electrons in discharge is determined by the discharge current. The ignition of a heated cathode arc discharge in the discharge cell provides for a significant increase of the discharge current (while preventing the creation of cathode spots caused thereby), for increase of the part of the electron current and reduction of the part of the ion current, as well as for reduction of the discharge voltage. The discharge cell of the present invention utilizes a self-heating electrode (rather than a direct-heating cathode of the prior art cell [23]), which is heated by ion bombardment up to a temperature of the noticeable thermionic emission. The use of an additional source of electrons (electrons emitted from the self-heating electrode) and the above-described configuration of the discharge cell (namely, its electrodes' arrangement) enables the increase of the discharge current by several times relative to the glow discharge current. The latter is limited to the current of about 1 A that corresponds to a boundary for the cathode spots creation, while the arc discharge current may be significantly higher than 3 A. By this, the part of electron current in the discharge current increases by several tens of percents due to the thermionic current. As a result, the extent of gas dissociation can be significantly increased.

In the general case, the energy distribution of electrons in the discharge is defined by the discharge voltage. A somewhat different situation occurs in the case of the self-heating electrode arc discharge, since two groups of electrons exist in this discharge. As a result of low voltage of the arc discharge, the temperature of plasma electrons is relatively low, being about 2–3 eV, while the average energy of thermionic electrons is significantly higher, because they collect energy during the voltage drop in the vicinity of the cathode. The value of this voltage drop is close to the discharge voltage and is about 100–150V Therefore, arc discharge, despite low discharge voltage, is characterized by the large number of high-energy (fast) electrons that effectively participate in the dissociation and ionization processes. Furthermore, the provision of the large number of fast thermionic electrons causes the formation of a corresponding number of hot atoms of hydrogen in the vicinity of the self-heating electrode. Hot atoms of hydrogen are obtained by dissociation of molecules by fast electrons. Redundancy of the electron energy relative to the energy of molecule's dissociation is partly transformed into kinetic energy of the formed atoms. A flow of hyperthermall atoms can be easily formed from these hot atoms of hydrogen.

The geometry of electrodes, their orientation with respect to each other, as well as the existence of a strong magnetic field provide for a long path of electrons in the discharge cell. The magnetic filed defines a spiral-like path of electrons while drifting in the crossing electric and magnetic fields E×B. The hollow cathode and reflective electrodes, under the same voltage condition, force the electrons to oscillate inside the hollow cathode and in the space between the cathodes. As a result, the electrons contribute all their energy into the gas dissociation and ionization.

According to the new approach utilized in the present invention, in order to increase the degree of dissociation of molecular hydrogen, conditions are created for additional dissociation of molecules of hydrogen in the emission channel and in a jet of plasma emerging from the discharge cell, i.e., within a transport space outside the discharge cell. The creation of a jet of plasma becomes possible upon achieving such a density of plasma within the region of the emitting aperture, that a double-thickness of the near-cathode layer becomes smaller than the diameter of the emitting aperture. Hence, in order to obtain a jet of plasma, the following main parameters should be controlled: discharge current, gas flow rate and diameter of the emitting aperture. The formation of a plasma jet is contributed by the electrons emitted from the self-heating electrode and high-energy electrons, which are capable of producing a large number of dissociation stages, as well as promoting the creation of hot atoms. Additionally, this type of dissociation advantageously occurs in the already formed expending flow of particles having directional velocities, and the so-produced atoms undergo interactions with neither the walls of the discharge cell nor the walls of the vacuum chamber, until they reach the treatment surface. By this, the recombination of atoms obtained in the plasma jet into molecules is completely prevented. As a result, the degree of gas dissociation occurring during operation of the atomic hydrogen source with the jet of plasma increases by several times, as compared to that of the operational mode of the source producing no plasma jet.

In the cases, when treatment of semiconductor structures by a flow of purely neutral particles is needed, charged particles forming a jet can be separated by any known suitable means, such as electrostatic or magnetic filters of charged particles. The inventors conducted several experiments, and the results have shown that a filter in the form of a flat capacitors with a 120V voltage supply to the capacitor's plates completely prevents charged particles from reaching the semiconductor substrate under treatment. Furthermore, it has been shown that in the absence of a charged particle filter, a maximal value of the entire current of charged particles that can be collected does not exceed 0.03% of the discharge current, and is 1–2 order less under the technological modes of the source operation.

It should also be noted that the jet is formed by charged particles of two types—electrons and ions. Owing to the fact that the cathode of the discharge cell, similar to all other constructional elements of a vacuum chamber, is grounded, and the anode has a positive voltage, the electrons in the jet carry out an oscillating movement along the jet until they lose their energy in interactions and reach the anode of the discharge cell. Therefore, the effect of electrons to the semiconductor substrate is avoided by the electrical power supply scheme.

To reduce the rate of atoms recombination on the walls of the discharge cell, the volume of the discharge cell should be increased. This, however, will require significant increase of the discharge current in order to keep the high density of discharge current and, consequently, a high degree of dissociation of molecules. All these factors lead to a complicated construction of the discharge cell and increase in power supply. To overcome these problems, the source of the present invention utilizes a principally different solution: The discharge cell has a relatively small volume (about 1–2 $cm^3$), which enables the use of a relatively low-power supply (about 500–1000 W) to obtain a very high density of power transformed into the discharge (about 500 $W/cm^3$) and obtain a high degree of gas dissociation pumped through the discharge cell. To this end, the emitting aperture is located in the region of maximal plasma density, where the concentration of fast electrons, and consequently, that of hot atoms, is maximal. Experiments carried out by the inventors have shown that the region of maximally dense plasma is located between the end of the self-heating element and the opposite wall of the reflective cathode, and hydrogen atoms are extracted into the formed flow mainly from a small volume of plasma in the vicinity of the emitting aperture. A part of atoms created far away from the emitting aperture and those supplied to the aperture as a result of collision motion in gas discharge plasma is relatively low in the formed flow due to high rate recombination atoms on cold wall of the cell. As for recombination on walls close to the emitting aperture, it is prevented by thermo-insulating those parts of the electrodes that are located proximate to the emitting aperture, thereby providing a high temperature thereof. Located in the vicinity of the emitting aperture are the self-heating electrode and the part of the reflective cathode which is in direct contact with the emitting aperture. The central part of the reflective cathode is made of a Mo- or W-foil, which, similar to the self-heating electrode, is heated by an ion bombardment. As a result, the temperature of the central part of the reflective cathode reaches 1300–1800 K, and the temperature of the self-heating electrode reaches 2500 K and more. At these temperatures, the rate of atom recombination on a metal surface reduces to a negligible value, while the rate of dissociation of molecules of hydrogen increases and can reach several percentages. Thus, the present invention provides not only for eliminating the influence of recombination in the vicinity of the emitting aperture, but even provides for creating an additional source of atomic hydrogen generation. Keeping in mind that the self-heating electrode has a temperature of 2500 K and more, the degree of gas dissociation solely due to the dissociation on the heated surface can reach 10% and more.

The above features of the source of the present invention also provide its high technological characteristics. The intensity of the atom flow can be controlled by varying such parameters as discharge current, the flow rate of gas pumped though the discharge cell and the diameter of the emitting aperture, which are easy to regulate. A wide range of gas flow rate variations (or wide range of pressures in the discharge cell) at which the functioning of discharge is maintained, is provided due to the optimal geometry and mutual orientation of the electrodes. This enables ignition in the discharge cell of a combined form discharge with heated cathode formed by: (1) a main arc Penning discharge and two auxiliary discharges: (2) a Penning discharge or Penning discharge with hollow cathode, and (3) a magnetron discharge with heated cathode. At low working pressures, the main discharge and auxiliary magnetron discharge is provided, while the increase in pressure and discharge current provides the plasma penetration into the hollow cathode and ignition of an additional auxiliary hollow cathode discharge. Furthermore, the use of the arc form of discharge as is allows for significantly widening the range of pressure values, as compared to that of to the RF and glow discharge. This is due to the fact that the supply of additional thermionic electrons into the discharge significantly reduces requirements to the reproduction of charged particles in discharge plasma and allows for maintaining the discharge at both super-low and super-high pressure values. A small emitting aperture enables the creation of a required pressure difference between the discharge cell and a treatment zone, as well as minimizing the output of charged particles and sputtered particles. The combined form discharge with heated cathode is characterized by high stability of ignition under the conditions of gas flow rate and voltage fluctuations, as well as by good controllability of its parameters.

Controlling the temperature of the flow-forming atoms is carried out by varying the discharge voltage, as well as by selecting the appropriate location for the emitting aperture. As for the discharge voltage, it can be controlled by regulating the discharge current, gas flow rate, or by mechanically altering heat dissipation from the self-heating electrode, thereby affecting its temperature.

Figure 6:
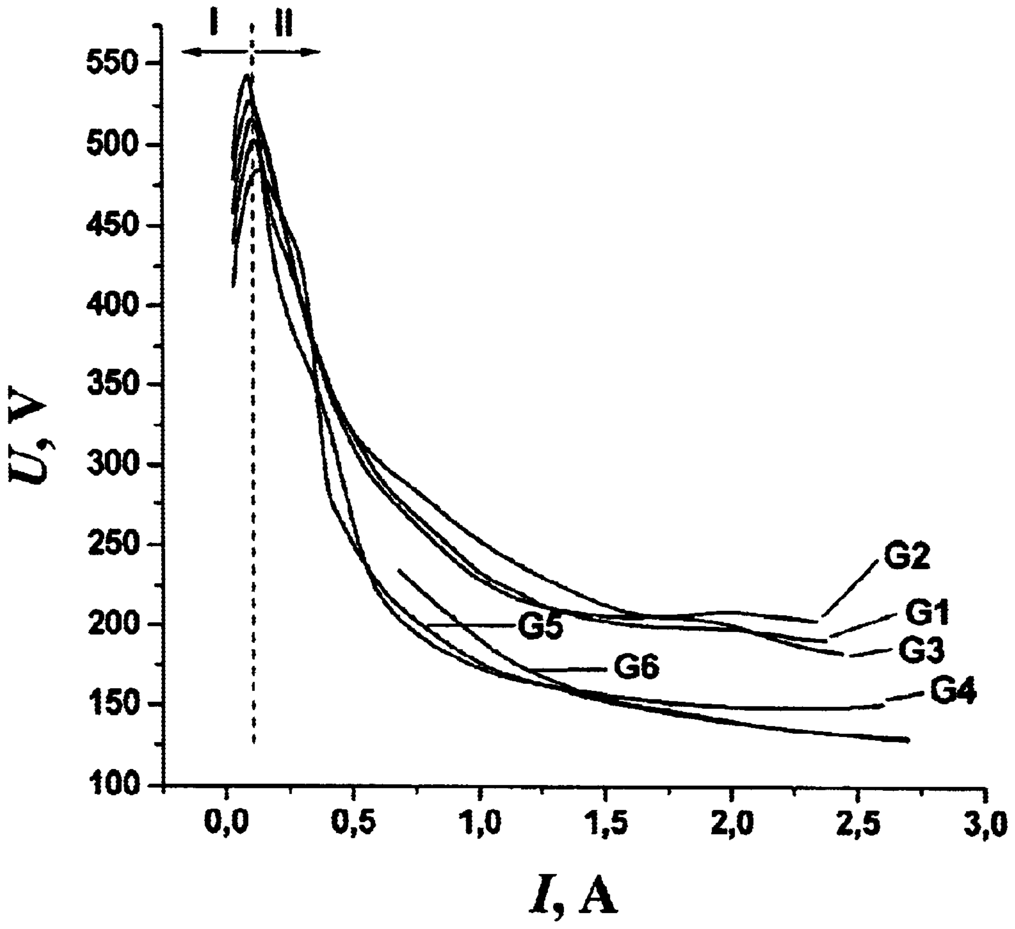
FIG. 6 illustrates the voltage-ampere characteristics of discharge with hollow cathode having a self-heating electrode for various gas flow rate values.

FIG. 6 illustrates the voltage-ampere characteristics of the combined form discharge with heated cathode. Six graphs designated $G_1$–$G_6$ correspond to the discharge voltage as functions of a current discharge at gas flow rate values of, respectively, 2.7 sccm, 3 sccm, 4.2 sccm, 6.2 sccm, 18.6 sccm and 51.3 sccm. As shown, at small values of the discharge current (zone I), the energy release on the cathode is insufficient for heating the cathode up to a high temperature, and therefore, a glow discharge characterized by the growing voltage-ampere characteristic is ignited in the cell. The growth of current causes heating of the self-heating electrode and transition of the discharge into an arc form, which is characterized by a falling voltage-ampere characteristic. (zone II). This falling zone presents a working region of the voltage-ampere characteristic of the source. Curves $G_1$–G3 characterize the situation when the auxiliary Penning discharge is ignited in the discharge cell, and curves $G_4$–$G_6$ characterize the situation with the auxiliary Penning discharge with hollow cathode. As indicated above, the temperature of the flow-forming atoms can be regulated by selecting the appropriate location for the emitting aperture. For example, if the emitting aperture is located in the proximity of the self-heating electrode in a region of high concentration of fast electrons, the flow will be mostly composed of hot atoms. Locating the emitting aperture in the proximity of the anode region, where no fast electrons exist, will cause formation of low-energy atoms of hydrogen. Intermediate locations of the emitting aperture will result in intermediate values of the atom energies.

One of the major problems of atomic hydrogen sources consists of contamination of the atomic hydrogen flow by impurities caused by erosion of electrode in discharge. The use of arc-form discharge enables complete elimination of such a strong source of contamination as cathode spots. As for the other, somewhat less strong source of contamination—cathode sputtering by ion bombardment thereof, this effect is also minimized in the atomic hydrogen source of the present invention. This is due to a significant reduction of the discharge voltage, making negligible the probability of tungsten-cathode sputtering by protons. To minimize thermal evaporation of wolfram from the surface of the self-heating electrode, which may also lead to contamination of the atomic hydrogen flow, the temperature of the self-heating electrode is appropriately selected by selecting the parameters of discharge ignition and heat-dissipation from the self-heating element.

The following are four examples of using the source of the present invention for producing an atomic hydrogen flow.

EXAMPLE 1

In this example, the source utilizing the discharge cell 10 of FIG. 4A was used. This example demonstrates the possibility of obtaining atomic hydrogen flows of various intensities. Controlling of the flow density was carried out by changing the discharge current, as well as by changing the diameter of the emitting aperture **16*a* by means of replacing the reflective cathode 16** with respect to the axis of the discharge cell.

Figure 7:
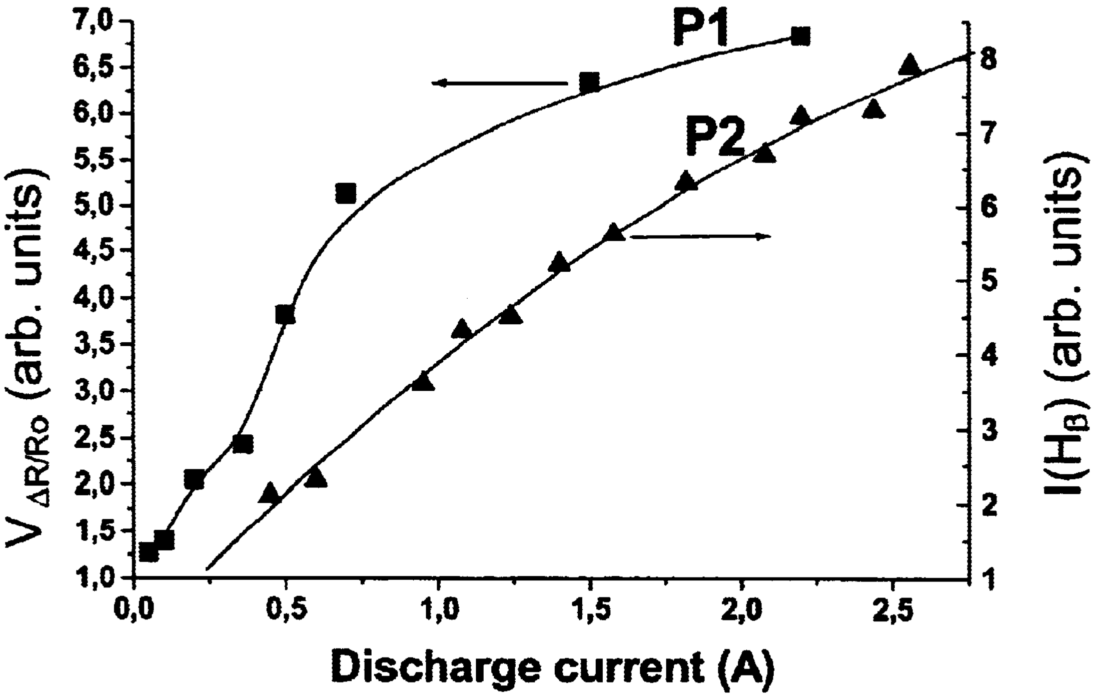
FIG. 7 illustrates experimental results of the dependency of density and concentration of atomic hydrogen flow in plasma of gas discharge on the variations of the discharge current.

The results of the first method consisting of changing the discharge current is illustrated in FIG. 7 showing two graphs $P_1$ and $P_2$ presenting, respectively, the flow density (atomic hydrogen output) and concentration of atomic hydrogen in plasma of gas discharge, as functions of the discharge current values (measured in relative units). The atomic hydrogen concentration in plasma of gas discharge was measured by optical spectroscopy, and the output of atomic hydrogen was measured by a sensor developed by the inventors of the present invention and disclosed in a co-pending patent application assigned to the assignee of the present application. This sensor does not form a part of the present invention and therefore need not be specifically described. Generally, any known suitable sensor of atomic hydrogen flow can be used for measurements. Different measurement techniques provide similar results. An increase of the discharge current leads to a proportional increase of the atomic hydrogen concentration in plasma and to the growth of the density of the atom flow emerging from the source. When the discharge current changes by 10 (from 0.25 A to 2.5 A) in the range of stable of the arc discharge in the discharge cell with self-heating electrode, an increase in the output of atoms by approximately 8 is observed. Mathematical processing of the so-obtained experimental data has shown that the density of the atom flow at a distance of 12 cm from the source, discharge current of 1.5 A, voltage of discharge of 205V and diameter of the emitting aperture of 0.5 mm, is about $5\times10^{14}$ atoms·cm$^{-2}$·s$^{-1}$. Hence, by changing the discharge current, the density of the atom flow can be easily changed within the range of approximately one order of magnitude.

Figure 8:
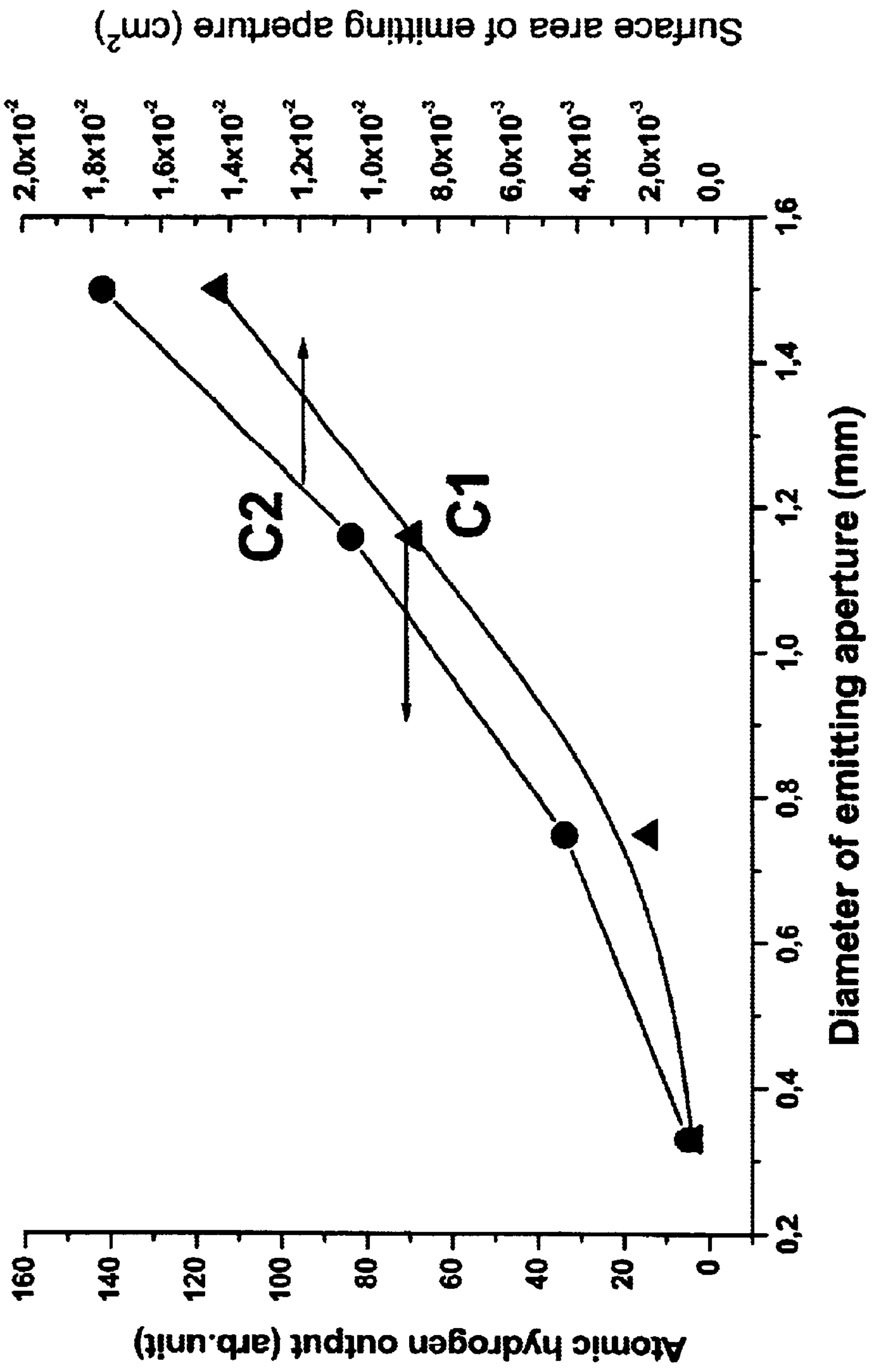
FIG. 8 shows the atomic hydrogen output as a function of the emitting aperture diameter values, and the surface area of the emitting aperture as a function of its diameter.

To increase the range of flow intensities, the second method consisting of using emitting apertures of different diameters can be used. This is illustrated in FIG. 8 showing the output of atomic hydrogen as a function of the emitting aperture diameter values (curve $C_1$), and the surface area of the emitting aperture as a function of its diameter (curve $C_2$). It is seen that the atomic hydrogen output from the source increases on more than two orders of magnitude with the increase of the diameter of the emitting aperture, the magnitude of the output flow of atoms being proportional to the surface area of the emitting aperture. This is indicative of the fact that only those atoms that are located directly proximate to the emitting aperture are extracted into the flow. Thus, changing the diameter of the emitting aperture, which is less precise technique than the first one, allowed for selecting the range and changing the flow density within 3 or more orders of magnitude.

EXAMPLE 2

The present example demonstrates the effect of increasing the atomic hydrogen output while utilizing transition from the source operation without a plasma jet to the operational mode with the plasma jet flowing through the emitting aperture into vacuum. An additional dissociation of hydrogen molecules occurring in the plasma jet, due to the oscillating electrons emitted from the butt-surface of the self-heating electrode and accelerated at the cathode potential drop, under a condition when the generated atoms are incapable of recombining on the cold walls of the cell, leads to a significant increase of the density of the atomic hydrogen flow.

The following table presents experimental data corresponding to the atomic hydrogen output for both operational modes, with and without the plasma jet. In these experiments the discharge cell of the above example of FIG. 5B, wherein the emitting aperture diameter is 0.5 mm, pressure in the vacuum chamber is $1.3\times10^{-2}$ Pa. The atomic hydrogen output values are presented in relative units.

| | Operational mode with the plasma jet | | Operational mode without the plasma jet | |
|---|---|---|---|---|
| Discharge current, A | 0.8 | 2.4 | 0.8 | 2.4 |
| Discharge voltage, V | 300 | 180 | 195 | 160 |
| Power density entering the discharge, W | 237 | 432 | 156 | 388 |
| Output of atomic hydrogen, arbitrary units | 1.8 | 8.1 | 0.75 | 1.34 |

Data presented in the above table show that the existence of the plasma jet provides for increasing the atomic hydrogen output by a factor of at least 2 at the current discharge of 0.8 A, and by a factor of at least 6 at the current discharge of 2.4 A.

EXAMPLE 3

The present example demonstrates the effect of decreasing the atomic hydrogen output by passing from the discharge cell operation mode with the second auxiliary discharge being a penning discharge (FIG. 5B) to its operational mode with the auxiliary discharge being a Penning discharge with hollow cathode. As can be seen from the experimental results presented in the table below, this change in the operational mode of the discharge cell results in the decrease of the atomic hydrogen output by a factor of 2.5.

| | Operational mode with Penning discharge | Operational mode with Penning discharge with hollow cathode |
|---|---|---|
| Discharge current, A | 2.4 | 2 |
| Discharge voltage, V | 160 | 190 |
| Power density entering the discharge, W | 384 | 380 |
| Output of atomic hydrogen, arbitrary units | 4 | 1.6 |

EXAMPLE 4

The present example demonstrates how the source of the present invention can be used for cleaning the surface $Al_{0.6}Ga_{0.4}As$. The cleaning procedure was carried out in the flow of atomic hydrogen within a system of vacuum deposition of thin metal films. The discharge current of the atomic hydrogen source was equal to 2 A, and the voltage of discharge was 200V. The pressure of the residual atmosphere in a vacuum chamber was about $(4–10)\times10^{-5}$ Pa. The pressure of hydrogen during the cleaning process was maintained at a level of $10^{-2}$ Pa, the temperature of the samples treatment T was changed from 300 to 400 C., and the treatment time t changed from 3 min to 90 min. Investigation of the surface cleaning used Auger electron-spectroscopy with layer-by-layer etching. To avoid the effects of oxidation of the samples' surfaces when they are transported into the chamber of Auger spectrometer, the samples were fed to the deposition zone immediately after being cleaned in the atomic hydrogen flow. At the deposition zone, a film of AuGe alloy was deposited onto the sample's surface.

Figure 9A:
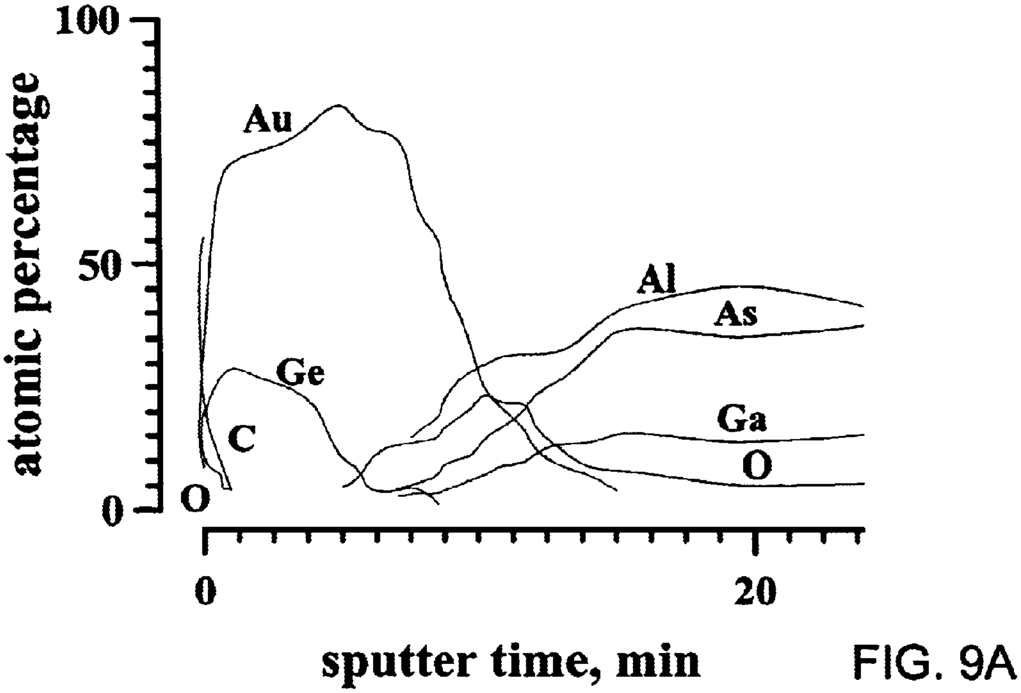
FIGS. 9A and 9B illustrate experimental results showing how the source device can be used for cleaning the surface of a semiconductor structure.
Figure 9B:
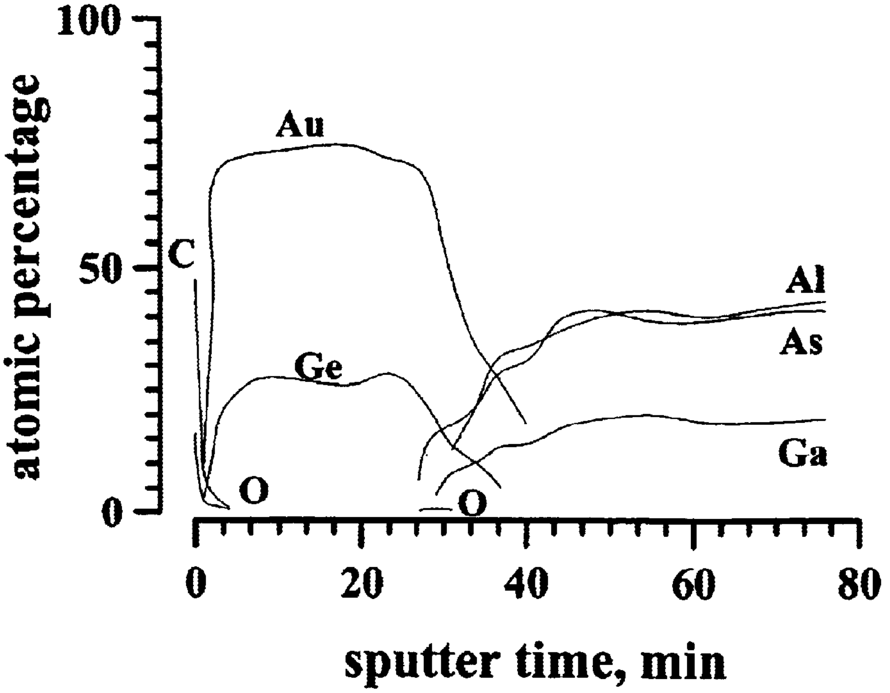

FIGS. 9*a* and 9*b* illustrate profiles of the components content distribution along the sample's depth as functions of sputter time for $AlGe/Al_{0.6}Ga_{0.4}As$ subjected to, respectively, chemical cleaning and atomic hydrogen cleaning. In the first case, the sample temperature during the AuGe-film deposition was 20 C., and in the both cases the thickness of the deposited film was about 0.1 μm.

The chemically cleaned sample was exposed to air for 5 minutes after cleaning. It is seen that an oxide layer (of a 0.2 μm thickness) exists at a boundary film-substrate. In this layer, two zones are observed: a zone of high concentration of oxygen, and a relatively low concentration region in the form of a long "tail" extending towards the depth of the sample.

The samples' treatment in the flow of atomic hydrogen was carried out for 30 minutes at a temperature of 350 C. As a result, an oxide layer was removed. It should be noted that after the atomic hydrogen treatment, the boundary film-substrate is free of other impurities (within the sensitivity range of Auger electron spectroscopy measurements), such as carbon that is easy to fix on the samples' surface.

The above experimental results thus show that the source device of the present invention can be effectively used in technological applications.

Thus, the invented method of obtaining atomic or excited particles is characterized by the following:

To obtain an intensive flow of atoms and provide the discharge operation within a wide range of current and pressure values, the dissociation of molecular hydrogen is carried out in the low-pressure gas discharge that consists of one main and two auxiliary discharges. The main arc Penning discharge is ignited directly in the proximity of the emitting aperture within a longitudinal magnetic field region between the self-heating and reflective cathodes 18 and 16 and the anode 12. The auxiliary magnetron discharge is ignited within the longitudinal magnetic field region between the self-heating electrode extending along the anode cavity, and the cylindrical anode. The auxiliary Penning discharge with or without hollow cathode is ignited within the longitudinal magnetic field region between the reflective cathode 14 (or reflective cathode with hollow cavity 114) and the reflective cathode 16 and anode 12.

The main discharge provides for obtaining a region of dense and hot plasma in the reflective cathode in the vicinity of the emitting aperture, as well as for forming a plasma jet emerging from the discharge cell. This region is characterized by high concentration of fast electrons, high degree of molecular hydrogen dissociation, and high percentage content of hot atoms. The separation of atoms from this region enables the formation of an intensive flow of hot atoms of hydrogen and minimization of atom loss caused by the recombination on the walls of the discharge cell.

The two auxiliary discharges provide for maintaining the main discharge within a wide range of discharge current and gas pressure values in the discharge cell, thereby increasing technological possibilities for using the source. For example, at low-pressure values, the auxiliary magnetron, auxiliary Penning and main discharges take place in the discharge cell, while at higher-pressure values, the auxiliary magnetron, auxiliary Penning with hollow cathode and main discharges take place in the discharge cell.

In order to obtain an intensive flow of hot atoms, the atoms are extracted from the zone of the main discharge through the emitting aperture in the reflective cathode 16 at both operational modes of the source: with and without the plasma jet.

The main arc Penning discharge is characterized by a high concentration of fast electrons emitted from the cathodes. As a result of ion-electron emission (γ-processes), the emission of electrons from both cathodes takes place, and, mostly important, the electron emission from the self-heating electrode caused by the thermionic emission is provided. Electrons emitted from the cathodes collect energy while passing through the near-cathode potential drop, and therefore affectively produce gas dissociation. The high concentration of fast electrons causes the generation of a large amount of hot atoms. The separation of hot atoms directly from the region of their generation allows for minimizing the number of interactions of atoms with other low-energy particles and with the walls of the discharge cell, that might result in the atoms losing part of their energy.

To obtain an intensive flow with various contents of hot atoms, the atoms are extracted from periphery regions of the zone of the main discharge and from the zones of auxiliary discharges through the emitting aperture in the reflective cathode, or through several such emitting apertures differently distanced from the axis of the discharge cell. The fast electrons' density is maximal at the axis of the discharge cell and decreases while approaching the cylindrical anode, the concentration of hot atoms being therefore distributed accordingly. Hence, moving the emitting aperture away from the axis of the discharge cell allows for reducing the content of hot atoms in the flow in a controllable manner.

To obtain an intensive flow of various atom flow densities, the diameter of the emitting aperture can be varied. The growth of atom flow density at a first approximation is proportional to the increase of the surface area of the emitting aperture. This is associated with the fact that separation of atoms into the flow occurs directly from the region of their generation, while atoms obtained far away from the emitting aperture give insignificant contribution into the total amount of atoms of hydrogen. Changing the diameter of the emitting aperture and the discharge current allows for changing the density of an output atom flow at an extent of several orders of magnitude.

To obtain an intensive flow of excited atoms of atomic gases (e.g., He, Ar, Kr), either one of the above-described techniques can be used. Excitation of atoms occurs at the atoms' interaction with electrons, and the excitation level is determined by the energy of electrons. Hence, most atoms are located at the axis of the discharge cell, and their concentration decreases when approaching the anode. By changing the region of atoms' separation, the content of the atoms in the flow excited at different levels can be regulated.

The source according to the present invention is characterized by the following:

An axially symmetric discharge cell comprises a cathode and anode, wherein the cathode is implemented from three electrodes: a self-heating electrode, flat reflective cathode with emitting aperture and reflective cathode with or without hollow cathode. The anode has a cylindrical shape and is located between the flat reflective cathode with emitting aperture and reflective cathode with or without hollow cathode. The flat reflective cathode is formed with an opening presenting the emitting aperture for the separation of atoms. The longitudinal magnetic field is created within the inter-electrode space.

The above construction of the discharge cell allows for igniting therein the main arc Penning discharge and two auxiliary discharges, at both operational modes of the source with and without the plasma jet. The provision of several electrodes having the potential of cathode results in that the trajectory of electron motion is increased due to the electrons' oscillations between the cathodes. The oscillations of electrons between the butt-end of the self-heating rod-like electrode and the reflective electrode cause the formation of a region of dense plasma of the main discharge in the vicinity of the emitting aperture. The provision of the hollow cathode increases the trajectory of the electrons' motion due to their oscillations inside the cathode cavity. The increase of this trajectory is also caused by crossing electric and magnetic fields. As a result, electrons are strongly magnetized and make circular motions about the lines of the magnetic field, while their motion towards the anode is caused only by the diffusion. These effects result in that electrons, prior to reaching the anode, lose all the energy, previously collected in the cathode potential drop, onto the dissociation and ionization processes. This defines the high effectiveness of the discharge type used in the source, with respect to both the production and maintenance of dense plasma and the production of atomic hydrogen.

Forming the emitting aperture in the flat reflective cathode, rather than in the anode as used in the prior art devices of the kind specified, provides for the intensive generation of hot atoms in the close vicinity of the emitting aperture. This is due to the fact that a region of maximal concentration of fast electrons is located in the near-cathode space. This leads to an increase in the content of hot atoms in the formed flow.

The present invention utilizes a self-heating electrode of various forms (e.g., a rod-like or hollow electrode) that can be accommodated at various locations in the discharge cell. The optimal geometry of the self-heating element depends on the technological orientation of the source.

The self-heating electrode may be completely or partly thermo-insulated. This allows for regulating its temperature independently of other parameters of the discharge (e.g., discharge current and voltage). The temperature of the self-heating electrode is a very important parameter of the source that defines the degree of dissociation of molecular hydrogen, the amount of contaminating particles in the formed flow and the mean-cycles-between-failures time. Therefore, independent control of this parameter is of importance to provide effective operation of the source.

In order to minimize the contamination of a treated plate by the products of sputtering of the self-heating electrode, the emitting aperture may be made with inclined walls. The walls are oriented at such an angle that eliminates the direct non-collision passage of metal particles sputtered from the surface of the self-heating electrode to the surface of a semiconductor structure under treatment. The use of various ratios between the diameter and length of the channel enables regulation of the amount of sputtered particles emerging from the discharge, amount of atomic particles, and space distribution of the sputtered atoms.

To minimize the recombination of atoms on the walls of the reflective electrode in the proximity of the emitting aperture, the temperature of the reflective electrode in the region of the emitting aperture is increased up to a value, at which the rate of dissociation on the heated surface is close to or exceeds the rate of recombination. To this end, the emitting aperture is thermo-insulated and is made of refractory metals or doped refractory metals with a reduced work function. Making the emitting aperture from doped refractory metals with a reduced work function enables the creation of an additional source of fast thermo-emission electrons directly inside the emitting aperture, thereby increasing the dissociation.

To minimize the affect of the charged particles onto a semiconductor structure under treatment, a charged particles filter can be used. Such a filter may be based on any known technique for filtering charged particles, for example effects of electrostatic or magnetic deflection or trapping of particles. The filter should be capable of effectively filtering both positive and negative particles of various masses from the flow of atoms.

Those skilled in the art will readily appreciate that various modifications and changes can be applied to the embodiments of the invention as hereinbefore exemplified without departing from its scope defined in and by the appending claims.

What is claimed is:

1. A method of producing an intensive flow of atoms from an input flow of a molecular gas with a source comprising a discharge cell connectable to a direct current source and defining at least one emitting aperture through which the flow is output from the cell, the method utilizing ignition of a gas discharge in said discharge cell and dissociation of the gas molecules by electron impact, and comprising:

providing ignition of the gas discharge of a complex type composed of a main discharge and two auxiliary discharges of different types ignited in substantially coinciding zones of the discharge cell, wherein said main discharge is an arc Penning discharge ignited in a zone of the vicinity of said at least one emitting aperture, the first auxiliary discharge is a magnetron discharge with heated cathode, and the second auxiliary discharge is one of the following: a Penning discharge, and a Penning discharge with hollow cathode, the dissociation of the gas molecules being thereby carried out in said complex discharge and resulting in creation of the flow of hot and thermally atoms.

2. The method according to claim 1, wherein the density of the output flow is about $10^{13}$–$10^{16}$ $cm^{-2}s^{-1}$.

3. The method according to claim 1, and also comprising the step of transition from the auxiliary Penning discharge with hollow cathode to the auxiliary Penning discharge without hollow cathode.

4. The method according to claim 3, wherein said transition comprises changing a distance between the surface of a self-heating elongated electrode at least partly installed in a hollow electrode and the inner wall of said hollow electrode, thereby defining the possibility of plasma penetration into the hollow cathode.

5. The method according to claim 1, and also comprising creation of a plasma jet emerging from the emitting aperture of the discharge cell, the dissociation of gas molecules being carried out in said plasma jet.

6. The method according to claim 1, wherein the zone of main arc Penning discharge is characterized by a high density of fast electrons, and the zones of the auxiliary discharges are characterized by a radial decrease of the density of fast electrons.

7. The method according to claim 1, wherein the flow of hot atoms is extracted from the zone of the main discharge.

8. The method according to claim 1, wherein the flow of atoms is extracted from different radial locations of the zone of the auxiliary discharges.

9. The method according to claim 1, wherein at least one atomic gas is used as a working gas, the extracted flow containing atoms excited to different energy levels by the electron bombardment.

10. The method according to claim 1, and also comprising controlling the density of said output flow of atoms by varying the diameter of said at least one emitting aperture.

11. The method according to claim 10, wherein said controlling of the output flow density comprises varying discharge current values.

12. The method according to claim 10, wherein said controlling of the output flow density comprises varying gas flow rate values.

13. A source device for producing an intensive flow of atomic or excited particles, the device being connectable to a direct current source and comprising an electrode' arrangement and a magnetic field source, wherein the electrode' arrangement comprises a cylindrical anode and a multiple-electrode cathode which are axially aligned and define an inter-electrode space for a longitudinal magnetic field region, wherein the multiple-electrode cathode comprises a first elongated self-heating electrode, a second flat reflective electrode in which at least one opening forming at least one emitting aperture is made, and a third reflective electrode the first electrode being electrically connected to the third electrode, when the device is put in operation;

the first self-heating elongated electrode is axially aligned with the cylindrical anode and penetrates into the anode cavity at a predetermined distance;

a butt-end of the first electrode located inside the anode cavity, a part of the surface of the second electrode opposite a butt-end of the first electrode and the cylindrical anode form a cell of a main arc Penning discharge ignitable in at least one zone in the vicinity of said at least one emitting aperture;

the first electrode and the cylindrical anode form a cell of a first auxiliary discharge, which is a magnetron discharge with heated cathode; and the second and third reflective electrodes and the cylindrical anode form a cell of a second auxiliary discharge, which is one of the following: a Penning discharge, and a Penning discharge with hollow cathode.

14. The device according to claim 13, wherein said third reflective electrode is a flat electrode located opposite to said second reflective electrode formed with the at least one emitting aperture, and comprises an opening through which the self-heating electrode is inserted into the anode cavity and which serves as an inlet for at least one molecular gas.

15. The device according to claim 13, wherein that part of said first electrode, which is located inside the anode cavity, has a hollow cavity of a length equal to or slightly less than the height of the anode.

16. The device according to claim 15, wherein said second auxiliary discharge is the Penning discharge.

17. The device according to claim 15, wherein said first auxiliary discharge is the magnetron discharge with heated cathode.

18. The device according to claim 15, wherein the main discharge is an arc Penning discharge with the self-heating hollow cathode.

19. The device according to claim 15, wherein the emitting aperture is formed by the opening in said second electrode and an opening in the butt-end of the hollow cathode cavity opposite to said opening in the second electrode.

20. The device according to claim 13, wherein said third reflective electrode has a hollow cavity located above said anode cavity, said first electrode extending along the axis of the hollow cavity thereinside, with a gap between the outer surface of the first electrode and the inner surface of the hollow cavity, and penetrating into the anode cavity said predetermined distance.

21. The device according to claim 20, wherein said second auxiliary discharge is the Penning discharge with hollow cathode.

22. The device according to claim 20, wherein the dimension of said gap is such as to allow plasma penetration into the hollow cavity, the second auxiliary discharge thereby being the Penning discharge with hollow cathode.

23. The device according to claim 22, wherein said gap dimension is 2 mm or more.

24. The device according to claim 20, wherein the dimension of said gap is such as to prevent plasma penetration into the hollow cavity, the second auxiliary discharge thereby being the Penning discharge.

25. The device according to claim 24, wherein said gap dimension substantially does not exceed 2 mm.

26. The device according to claim 20, and also comprising a plate located above the anode and being made with an opening of a cross-section slightly larger than the cross-section of the self-heating electrode, which electrode passes through said opening in the plate.

27. The device according to claim 26, wherein said second auxiliary discharge is the Penning discharge.

28. The device according to claim 27, wherein the cross-section of said opening is larger than that of the self-heating electrode on about 0.2–0.6 mm.

29. The device according to claim 27, wherein said hollow cavity provides heat insulation of the self-heating electrode.

30. The device according to claim 13, wherein the self-heating electrode is at least partly thermo-insulated.

31. The device according to claim 13, wherein the self-heating electrode is made of at least one refractory metal or doped refractory metal with a reduced work function.

32. The device according to claim 13, wherein said magnetic field source comprises a ring-like magnet surrounding the cylindrical anode.

33. The device according to claim 13, wherein the at least one emitting aperture is located at the axis of the electrode' arrangement.

34. The device according to claim 13, wherein more than one emitting apertures are provided being formed by openings in the second reflective electrode.

35. The device according to claim 34, wherein the emitting apertures are located at different distances from the axis of the electrode' arrangement.

36. The device according to claim 34, wherein the emitting apertures are arranged in a circular array being located in a spaced-apart relationship at the same radial distance from the axis of the electrode' arrangement.

37. The device according to claim 13, wherein the at least one emitting aperture is formed by at least one opening with inclined walls.

38. The device according to claim 13, wherein the at least one emitting aperture is thermo-insulated, being made of at least one refractive metal or doped refractive metal with a reduced work function.

39. The device according to claim 13, and also comprising a charged particle' filter accommodated at the output of the emitting aperture.

40. A source device for producing an intensive flow of atomic or excited particles, the device being connectable to a direct current source and comprising an electrode' arrangement and a magnetic field source, wherein the electrode' arrangement comprises a cylindrical anode and a multiple-electrode cathode which are axially aligned and define an inter-electrode space for a longitudinal magnetic field region;

the multiple-electrode cathode includes a first elongated self-heating electrode, a second flat reflective electrode in which at least one opening forming at least one emitting aperture is made, and a third reflective electrode, which is a flat electrode located opposite to said second reflective electrode and comprises an opening, through which the self-heating electrode is inserted into the anode cavity and which serves as an inlet for at least one molecular gas, the anode being located between the second and third electrodes, and the first electrode being electrically connected to the third electrode, when the device is put in operation;

the first self-heating elongated electrode is axially aligned with the cylindrical anode and penetrates into the anode cavity at a predetermined distance;

a butt-end of the first electrode located inside the anode cavity, a part of the surface of the second electrode opposite a butt-end of the first electrode and the cylindrical anode form a cell of a main arc Penning discharge ignitable in at least one zone in the vicinity of said at least one emitting aperture;

the first electrode and the cylindrical anode form a cell of a first auxiliary discharge, which is a magnetron discharge with heated cathode; and the second and third reflective electrodes and the cylindrical anode form a cell of a second auxiliary discharge, which is a Penning discharge.

41. A source device for producing an intensive flow of atomic or excited particles, the device being connectable to a direct current source and comprising an electrode' arrangement and a magnetic field source, wherein the electrode' arrangement comprises a cylindrical anode and a multiple-electrode cathode which are axially aligned and define an inter-electrode space for a longitudinal magnetic field region;

the multiple-electrode cathode includes a first elongated self-heating electrode, a second flat reflective electrode in which at least one opening forming at least one emitting aperture is made, and a third reflective electrode, the anode being located between the second and third electrodes, and the first electrode being electrically connected to the third electrode, when the device is put in operation;

the first self-heating elongated electrode is axially aligned with the cylindrical anode and penetrates into the anode cavity at a predetermined distance, the part of the first electrode located inside the anode cavity having a hollow cavity of a length equal to or slightly less than the height of the anode cavity;

a butt-end of the first electrode located inside the anode cavity, a part of the surface of the second electrode opposite a butt-end of the first electrode and the cylindrical anode form a cell of a main arc Penning discharge with the self-heating hollow cathode ignitable in at least one zone in the vicinity of said at least one emitting aperture;

the first electrode and the cylindrical anode form a cell of a first auxiliary discharge, which is a magnetron discharge with heated cathode; and the second and third reflective electrodes and the cylindrical anode form a cell of a second auxiliary discharge, which is a Penning discharge.

42. A source device for producing an intensive flow of atomic or excited particles, the device being connectable to a direct current source and comprising an electrode' arrangement and a magnetic field source, wherein the electrode' arrangement comprises a cylindrical anode and a multiple-electrode cathode which are axially aligned and define an inter-electrode space for a longitudinal magnetic field region;

the multiple-electrode cathode includes a first elongated self-heating electrode, a second flat reflective electrode in which at least one opening forming at least one emitting aperture is made, and a third reflective electrode, the anode being located between the second and third electrodes, and the first electrode being connected to the third electrode, when the device is put in operation;

the first self-heating elongated electrode is axially aligned with the cylindrical anode and penetrates into the anode cavity at a predetermined distance;

the third electrode has a hollow cavity located above said anode cavity, said first electrode extending along the axis of the hollow cavity thereinside with a gap between the outer surface of the first electrode and the inner surface of the hollow cavity;

a butt-end of the first electrode located inside the anode cavity, a part of the surface of the second electrode opposite a butt-end of the first electrode and the cylindrical anode form a cell of a main arc Penning discharge ignitable in at least one zone in the vicinity of said at least one emitting aperture;

the first electrode and the cylindrical anode form a cell of a first auxiliary discharge, which is a magnetron discharge with heated cathode; and the second and third reflective electrodes and the cylindrical anode form a cell of a second auxiliary discharge, which a Penning discharge with hollow cathode.

43. A source device for producing an intensive flow of atomic or excited particles, the device being connectable to a direct current source and comprising an electrode' arrangement and a magnetic field source, wherein the electrode' arrangement comprises a cylindrical anode and a multiple-electrode cathode which are axially aligned and define an inter-electrode space for a longitudinal magnetic field region;

the multiple-electrode cathode includes a first elongated self-heating electrode, a second flat reflective electrode in which at least one opening forming at least one emitting aperture is made, and a third reflective electrode, the anode being located between the second and third electrodes, and the first electrode being connected to the third electrode, when the device is put in operation;

the first self-heating elongated electrode is axially aligned with the cylindrical anode and penetrates into the anode cavity at a predetermined distance, the first self-heating electrode passing through an opening made in a plate located above the anode, said opening having a cross-section equal to or slightly larger than the cross section of the first electrode;

the third electrode has a hollow cavity located above said anode cavity, said first electrode extending along the axis of the hollow cavity thereinside with a gap between the outer surface of the first electrode and the inner surface of the hollow cavity;

a butt-end of the first electrode located inside the anode cavity, a part of the surface of the second electrode opposite a butt-end of the first electrode and the cylindrical anode form a cell of a main arc Penning discharge ignitable in at least one zone in the vicinity of said at least one emitting aperture;

the first electrode and the cylindrical anode form a cell of a first auxiliary discharge, which is a magnetron discharge with heated cathode; and the second and third reflective electrodes and the cylindrical anode form a cell of a second auxiliary discharge, which is a Penning discharge.

* * * * *